US012018142B2

(12) United States Patent
Leaf et al.

(10) Patent No.: US 12,018,142 B2
(45) Date of Patent: Jun. 25, 2024

(54) FLUORINE-FREE POLYMER PROCESSING AIDS INCLUDING POLYETHYLENE GLYCOLS

(71) Applicant: ExxonMobil Chemical Patents Inc., Baytown, TX (US)

(72) Inventors: Michael A. Leaf, Baytown, TX (US); Danny Van Hoyweghen, Heverlee (BE); Nino Ruocco, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 17/934,994

(22) Filed: Sep. 23, 2022

(65) Prior Publication Data
US 2023/0036922 A1 Feb. 2, 2023

Related U.S. Application Data

(60) Provisional application No. 63/261,908, filed on Sep. 30, 2021, provisional application No. 63/266,782, filed on Jan. 14, 2022, provisional application No. 63/267,640, filed on Feb. 7, 2022, provisional application No. 63/309,859, filed on Feb. 14, 2022, provisional application No. 63/309,871, filed on Feb. 14, 2022, provisional application No. 63/366,678, filed on Jun. 20, 2022, provisional application No. 63/367,241, filed on Jun. 29, 2022, provisional application No. 63/367,425, filed on Jun. 30, 2022.

(51) Int. Cl.
C08L 23/08 (2006.01)
C08J 5/18 (2006.01)
C08K 5/06 (2006.01)
C08K 5/098 (2006.01)
C08K 5/1535 (2006.01)
C08L 71/02 (2006.01)
C08L 23/06 (2006.01)

(52) U.S. Cl.
CPC .......... *C08L 23/0815* (2013.01); *C08J 5/18* (2013.01); *C08K 5/06* (2013.01); *C08K 5/098* (2013.01); *C08K 5/1535* (2013.01); *C08L 71/02* (2013.01); *C08J 2323/08* (2013.01); *C08L 23/06* (2013.01); *C08L 2203/16* (2013.01); *C08L 2205/06* (2013.01); *C08L 2207/066* (2013.01)

(58) Field of Classification Search
CPC .......... C08L 23/04; C08L 23/06; C08L 23/08; C08L 23/0807; C08L 23/0815; C08L 71/02
See application file for complete search history.

(56) References Cited

U.S. PATENT DOCUMENTS

| | | | |
|---|---|---|---|
| 3,222,314 A | 12/1965 | Wolinski | |
| 4,013,622 A | 3/1977 | DeJuneas et al. | |
| 4,415,691 A | 11/1983 | Allen et al. | |
| 4,540,538 A | 9/1985 | Corwin et al. | |
| 4,855,360 A | 8/1989 | Duchesne et al. | |
| 5,015,693 A | 5/1991 | Duchesne et al. | |
| 5,550,193 A | 8/1996 | Chiu | |
| 6,294,604 B1 | 9/2001 | Focquet et al. | |
| 7,442,742 B1 | 10/2008 | Smink et al. | |
| 7,528,185 B2 | 5/2009 | Lee | |
| 8,178,479 B2 | 5/2012 | Cernohous | |
| 8,388,868 B2 | 3/2013 | Easter | |
| 8,455,580 B2 | 6/2013 | Sengupta et al. | |
| 8,552,136 B2 | 10/2013 | Papp et al. | |
| 8,728,370 B2 | 5/2014 | Vogt et al. | |
| 9,115,274 B2 | 8/2015 | Bates | |
| 9,187,629 B2 | 11/2015 | Adamczyk et al. | |
| 9,896,575 B2 | 2/2018 | Duchesne et al. | |
| 10,242,769 B2 | 3/2019 | Kohri et al. | |
| 10,544,293 B2 | 1/2020 | Kohri et al. | |
| 10,982,079 B2 | 4/2021 | Lavallee et al. | |
| 2003/0040695 A1 | 2/2003 | Zhao et al. | |
| 2005/0070644 A1 | 3/2005 | Tikuisis et al. | |
| 2006/0217490 A1* | 9/2006 | Lee ................... | C08L 23/06 525/240 |
| 2008/0132654 A1 | 6/2008 | Ho et al. | |
| 2008/0318065 A1 | 12/2008 | Sherman et al. | |
| 2009/0043012 A1 | 2/2009 | Easter | |
| 2010/0216923 A1* | 8/2010 | Stevenson ........... | C08K 5/52 524/140 |

(Continued)

FOREIGN PATENT DOCUMENTS

| | | |
|---|---|---|
| CA | 641321 A * | 5/1962 |
| CA | 2264463 A1 | 9/2000 |

(Continued)

*Primary Examiner* — John M Cooney
*Assistant Examiner* — Jeffrey S Lenihan
(74) *Attorney, Agent, or Firm* — ExxonMobil Technology and Engineering Company-Chemicals

(57) ABSTRACT

Provided herein are polymer compositions comprising a polymer and polyethylene glycol (PEG)-based polymer processing aid (PPA). The polyethylene glycol can have molecular weight less than 40,000 g/mol. The polymer can be a $C_2$-$C_6$ olefin homopolymer or a copolymer of two or more $C_2$-$C_{20}$ α-olefins, and the polymer composition can take the form of polymer pellets; a polymer melt; reactor-grade polymer granules and/or polymer slurries; or other form of polymer composition containing the PPA and optionally one or more other additives. The polymer composition is preferably free or substantially free of fluorine, including fluoropolymer-based PPAs.

8 Claims, 9 Drawing Sheets

(56) References Cited

U.S. PATENT DOCUMENTS

| | | |
|---|---|---|
| 2013/0068498 A1 | 3/2013 | Adamczyk et al. |
| 2014/0182882 A1 | 7/2014 | Adamczyk |
| 2014/0242314 A1 | 8/2014 | Inn et al. |
| 2015/0175785 A1 | 6/2015 | Lavallee et al. |
| 2015/0315401 A1 | 11/2015 | Lee |
| 2016/0145427 A1 | 5/2016 | Eng et al. |
| 2016/0229994 A1 | 8/2016 | Lavallee et al. |
| 2017/0342245 A1 | 11/2017 | Lavallee et al. |
| 2020/0325314 A1 | 10/2020 | Bergqvist et al. |
| 2022/0112363 A1 | 4/2022 | Hamad et al. |

FOREIGN PATENT DOCUMENTS

| | | |
|---|---|---|
| CN | 103772789 B | 4/2016 |
| CN | 104558751 B1 | 6/2017 |
| CN | 107540920 A | 1/2018 |
| CN | 110317383 | 10/2019 |
| CN | 108481855 B | 7/2020 |
| CN | 112029173 A | 12/2020 |
| EP | 0217585 A2 * | 4/1987 |
| EP | 0859025 B1 * | 3/2003 |
| JP | 2011032399 A * | 2/2011 |
| JP | 2012009754 | 1/2012 |
| KR | 10-2020-0053903 | 5/2020 |
| KR | 10-2167728 | 10/2020 |
| WO | WO9810928 A1 * | 3/1998 |
| WO | 2005054315 A1 | 6/2005 |
| WO | 2011-028206 | 3/2011 |
| WO | 2017-077455 | 5/2017 |
| WO | 2021/220134 A1 | 11/2021 |
| WO | 2022-076296 A1 | 4/2022 |
| WO | 2022-079601 A1 | 4/2022 |
| WO | 20230285888 | 1/2023 |

\* cited by examiner

FLUORINE-FREE POLYMER PROCESSING AIDS INCLUDING POLYETHYLENE GLYCOLS

CROSS-REFERENCED RELATED APPLICATIONS

This application claims the benefit of U.S. Provisional Application 63/261,908 filed Sep. 30, 2021 entitled "Fluorine-Free Polymer Processing Aids", and also claims the benefit of U.S. Provisional Application 63/266,782 filed Jan. 14, 2022 entitled "Fluorine-Free Polymer Processing Aids", and also claims the benefit of U.S. Provisional Application 63/267,640 filed Feb. 7, 2022 entitled "Fluorine-Free Polymer Processing Aids Including Polyethylene Glycols", and also claims the benefit of U.S. Provisional Application 63/309,859 filed Feb. 14, 2022 entitled "Fluorine-Free Polymer Processing Aids Including Polyethylene Glycols", and also claims the benefit of U.S. Provisional Application 63/309,871 filed Feb. 14, 2022 entitled "Fluorine-Free Polymer Processing Aid Blends", and also claims the benefit of U.S. Provisional Application 63/366,678 filed Jun. 20, 2022 entitled "Fluorine-Free Polymer Processing Aid Blends", and also claims the benefit of U.S. Provisional Application 63/367,241 filed Jun. 29, 2022 entitled "Polyethylene Glycol-Based Polymer Processing Aids", and also claims the benefit of U.S. Provisional Application 63/367,425 filed Jun. 30, 2022 entitled "Polyethylene Glycol-Based Polymer Processing Aid Masterbatches", the entireties of which are incorporated by reference herein.

FIELD

The present disclosure relates to additives for polyolefin polymers (such as polyethylene), as well as the polymers themselves, methods of making them, and articles made therefrom.

BACKGROUND

Polyolefin polymer compositions are in high demand for many applications, including various films (such as cast films, shrink films, and blown films), sheets, membranes such as geomembranes, sacks, pipes (e.g., polyethylene of raised temperature (PE-RT) pipes, utility pipes, and gas distribution pipes), roto-molded parts, blow-molded flexible bottles or other containers, and various other blow molded/extruded articles such as bottles, drums, jars, and other containers. These applications have been commonly made from, for example, polyethylene polymers.

Polyolefin polymers are most commonly produced and sold as pellets, formed in post-polymerization reactor finishing processes (such as extrusion of polymer product that is in an at least partially molten state, followed by pelletization). Additives are commonly blended into the polymer product as part of this finishing process, such that the polymer pellets comprise the polymer itself and one or more additives.

Common additives, particularly for polymers such as polyethylenes intended for use as films, sacks, and other similar articles, include polymer processing aids (PPAs), which help make the pellets easier to manipulate in downstream manufacturing processes (such as extrusion, rolling, blowing, casting, and the like). Adequate amounts of PPA, among other things, help eliminate melt fractures in films made from the polymer pellets. This is particularly so for polymer pellets exhibiting relatively higher viscosity in extrusion processes. Melt fracture is a mechanically-induced melt flow instability which occurs, e.g., at the exit of an extrusion die and typically in conditions of high shear rate. Pinhole, linear, and annular die geometries are among those that can induce melt fracture. There are different mechanical regimes that describe PE melt fracture, but all manifest as a very rough polymer surface which persists as the polymer crystallizes. Commonly in the blown film industry, a rough array of sharkskin like patterns develop on the film surface, often with a characteristic size from the mm to cm scale, and they depend on both the flow profile and rheology of the polyolefin polymer (e.g., polyethylene).

Melt fracture can adversely affect film properties, distort clarity, and reduce gauge uniformity. Thus, melt fracture-prone polymer grades, as noted, often rely on a PPA.

The most common PPAs are or include fluoropolymers (fluorine-containing polymers). It is, however, desired to find alternative PPAs that do not include fluoropolymers and/or fluorine, while maintaining the effectiveness of fluoropolymer-based PPAs in preventing melt fractures.

Some references of potential interest in this regard include: U.S. Pat. Nos. 10,982,079; 10,242,769; 10,544,293; 9,896,575; 9,187,629; 9,115,274; 8,552,136; 8,455,580; 8,728,370; 8,388,868; 8,178,479; 7,528,185; 7,442,742; 6,294,604; 5,015,693; and 4,540,538; U.S. Patent Publication Nos. 2005/0070644, 2008/0132654, 2014/0182882, 2014/0242314, 2015/0175785, 2020/0325314; as well as WO2022/079601; WO2022/076296; WO2020/146351; EP3234004; WO2011/028206, CN104558751, CN112029173, KR10-2020-0053903, CN110317383, JP2012009754A, WO2017/077455, CN108481855, CN103772789.

SUMMARY

The present disclosure relates to polymer compositions, their methods of manufacture, and articles including and/or made from the polymer compositions. In a particular focus, the polymer compositions may be polyolefin compositions, such as polyethylene compositions. The polymer compositions can also include a PPA that is free or substantially free of fluorine; and, similarly, the polymer compositions can be free or substantially free of fluorine. In this context, "substantially free" permits trace amounts (e.g., 10 ppm or less, preferably 1 ppm or less, such as 0.1 ppm or less) of fluorine, e.g., as an impurity, but well below the amount that would intentionally be included in a polymer composition via such additives (e.g., about 100 ppm of fluorine atoms by mass of polymer product in a typical case where such additives are included). In various embodiments, the polymer compositions can be, e.g., polymer pellets; a polymer melt (as would be formed in an extruder such as a compounding extruder); reactor-grade polymer granules and/or polymer slurries; or other form of polymer composition containing the PPA and optionally one or more other additives.

The present disclosure also relates to films and/or other end-use articles made from such polymer compositions, and in particular instances can relate to cast or blown films, preferably blown films. Thus, the polyolefin compositions (e.g., polymer pellets) of various embodiments, and/or films or other articles made therefrom (e.g., blown films), are themselves free or substantially free of fluorine (or, at a minimum, free or substantially free of fluorine-is based PPA). A fluorine-based PPA, as used herein, is a polymer processing aid or other polymeric additive containing fluorine.

The present inventors have found that polyethylene glycol (PEG) is an advantageous replacement of fluorine-based PPAs in polyolefin compositions; and, in particular embodiments, the PEG-based PPA comprises a PEG having molecular weight less than 40,000 g/mol, such as within the range from 1,500 to 35,000 g/mol, such as 5,000 to 12,000 g/mol, or 5,000 to 20,000 g/mol. The PEG-based PPA preferably comprises at least 80 wt % (on the basis of total mass of the PPA) PEG, more preferably at least 90 wt %, or at least 99 wt %. The PEG-based PPA can consist or consist essentially of the PEG. Thus, polyolefin compositions of various embodiments comprise an olefin-based polymer and a PPA comprising at least 90 wt % or at least 99 wt % of a polyethylene glycol having molecular weight of 1,500 to 40,000 g/mol. And, while polymer compositions of certain embodiments may include other additives (even other PPAs such as fluorine-based PPAs) in addition to the PEG-based PPA, in preferred embodiments—as just noted above—the polymer composition is free or substantially free of fluorine. It is also, according to some embodiments, free or substantially free of other PPAs.

The PEG (or PPA comprising at least 80 wt %, at least 90 wt %, or at least 99 wt % of PEG) can be present in the polymer composition in amounts ranging from about 300 ppm to about 15000 ppm, on the basis of mass of polymer in the polymer composition, more preferably about 300 ppm to about 2000 ppm, or about 600 ppm to about 1200 ppm, although lower amounts (e.g., 50 or 100 ppm to 200, 300, 400, or 500 ppm) can be employed where other PPAs will be used (e.g., conventional fluorine-based PPAs or, more preferably, other PPAs free or substantially free of fluorine). As noted, other additives optionally can also be present in the polymer composition (e.g., antioxidants, stabilizers such as UV stabilizers, catalyst neutralizers, and other additives known in the art of polymerization). The polymer and PEG-based PPA included in polymer compositions of various embodiments are discussed in more detail below.

The present inventors have also surprisingly found that the method of introducing PEG into the polymer composition can affect ease of processing the polymer composition. Accordingly, the invention in some embodiments resides in methods of mixing PEG-based PPA, comprising melt blending the PEG composition and a polymer (e.g., a polyethylene polymer), such as in an extruder at elevated temperatures (e.g., 200° C. or higher). For example, such methods include melt-blending; and/or coextruding the PEG and polymer (and optional other additives) in a compound extruder, and pelletizing the mixture upon its exit from the extruder, thereby locking the homogenously blended mixture in place.

DETAILED DESCRIPTION

Definitions

Figure 1:
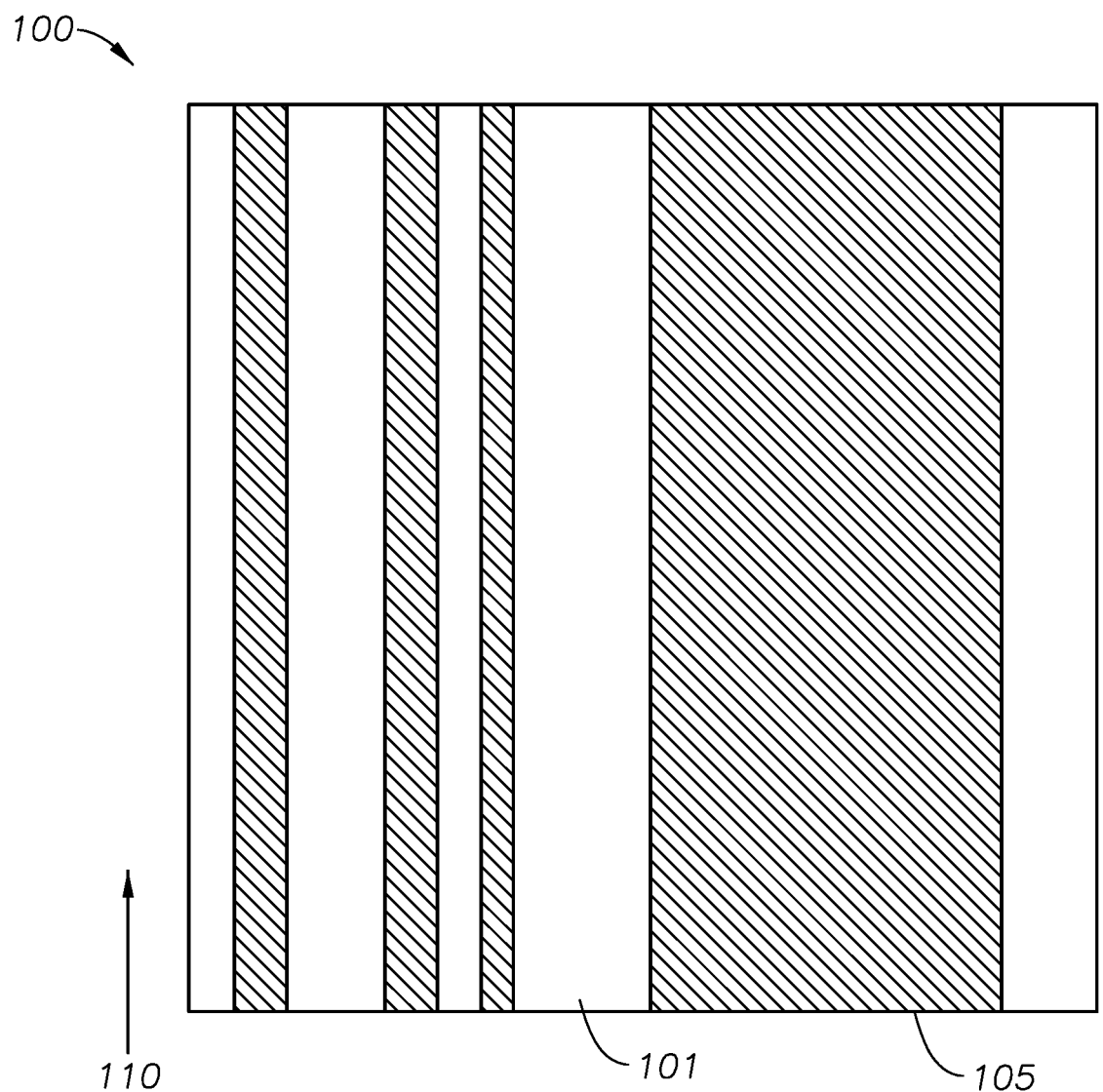
FIG. 1 is a schematic conceptually illustrating streaks of melt fractures and stripes of regions with melt fractures eliminated in a blown film during extrusion.

For the purposes of the present disclosure, various terms are defined as follows.

The term "polyethylene" refers to a polymer having at least 50 wt % ethylene-derived units, such as at least 70 wt % ethylene-derived units, such as at least 80 wt % ethylene-derived units, such as at least 90 wt % ethylene-derived units, or at least 95 wt % ethylene-derived units, or 100 wt % ethylene-derived units. The polyethylene can thus be a homopolymer or a copolymer, including a terpolymer, having one or more other monomeric units. A polyethylene described herein can, for example, include at least one or more other olefin(s) and/or comonomer(s).

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 50 wt % to 55 wt %, it is understood that the mer unit in the copolymer is derived from ethylene in the polymerization reaction and said derived units are present at 50 wt % to 55 wt %, based upon the weight of the copolymer. A "polymer" has two or more of the same or different mer units. A "homopolymer" is a polymer having mer units that are the same. A "copolymer"

is a polymer having two or more mer units that are different from each other. A "terpolymer" is a polymer having three mer units that are different from each other. Accordingly, the definition of copolymer, as used herein, includes terpolymers and the like. "Different" as used to refer to mer units indicates that the mer units differ from each other by at least one atom or are different isomerically.

The term "alpha-olefin" or "a-olefin" refers to an olefin having a terminal carbon-to-carbon double bond in the structure thereof $R^1R^2C=CH_2$, where $R^1$ and $R^2$ can be independently hydrogen or any hydrocarbyl group; such as $R^1$ is hydrogen and $R^2$ is an alkyl group. A "linear alpha-olefin" is an alpha-olefin wherein $R^1$ is hydrogen and $R^2$ is hydrogen or a linear alkyl group. For the purposes of the present disclosure, ethylene shall be considered an α-olefin.

As used herein, the term "extruding" and grammatical variations thereof refer to processes that include forming a polymer and/or polymer blend into a melt, such as by heating and/or sheer forces, and then forcing the melt out of a die in a form or shape such as in a film, or in strands that are pelletized. Most any type of apparatus will be appropriate to effect extrusion such as a single or twin-screw extruder, or other melt-blending device as is known in the art and that can be fitted with a suitable die. It will also be appreciated that extrusion can take place as part of a polymerization process (in particular, in the finishing portion of such process) as part of forming polymer pellets; or it can take place as part of the process for forming articles such as films from the polymer pellets (e.g., by at least partially melting the pellets and extruding through a die to form a sheet, especially when combined with blowing air such as in a blown film formation process). In the context of the present disclosure, extrusion in the finishing portion of polymerization processes may be referred to as compounding extrusion, and typically involves feeding additives plus additive-free (reactor grade) polymer to the extruder; while extrusion of polymer to make articles (e.g., extrusion of polymer pellets to make films) takes place conceptually "downstream" (e.g., at a later point, after polymer product has been formed including through compounding extrusion), and typically involves feeding optional additives plus additive-containing polymer to the extruder.

Polymers

In various embodiments, polymer compositions include one or more polymers, preferably polyolefin polymers. Examples include homopolymers (e.g., homopolymers of a $C_2$ to $C_{10}$ α-olefin, preferably a $C_2$ to $C_6$ α-olefin). Particular examples of homopolymers include homopolyethylene and polypropylene (hPP). Taking for example homopolyethylene, such a polymer may be produced, e.g., by free radical polymerization in a high-pressure process, resulting typically in a highly branched ethylene homopolymer—often known as LDPE (low density polyethylene), having density less than 0.945 g/cm³, often 0.935 g/cm³ or less, such as within the range from 0.900, 0.905, or 0.910 g/cm³ to 0.920, 0.925, 0.927, 0.930, 0.935, or 0.945 g/cm³. Unless otherwise noted herein, all polymer density values are determined per ASTM D1505. Samples are molded under ASTM D4703-10a, procedure C, and conditioned under ASTM D618-08 (23°±2° C. and 50±10% relative humidity) for 40 hours before testing.

In another example, ethylene monomers may be polymerized via known gas, slurry, and/or solution phase polymerization (e.g., using catalysts such as chromium-based catalysts, or single-site catalysts such as Ziegler-Natta and/ or metallocene catalysts, all of which are well known in the art of polymerization and not discussed further herein. Where a more highly linear ethylene homopolymer is produced (e.g., using gas or slurry phase polymerization with any of the above noted catalysts), it may be referred to as HDPE (high density polyethylene), typically having density 0.945 g/cm³ or greater, such as within the range from 0.945 to 0.970 g/cm³.

Yet further polymer examples include copolymers of two or more $C_2$ to $C_{40}$ α-olefins, such as $C_2$ to $C_{20}$ α-olefins, such as ethylene-α-olefin copolymers, or propylene-α-olefin copolymers (e.g., propylene-ethylene copolymers, or propylene-ethylene-diene terpolymers, sometimes known as EPDMs or PEDMs). Particular examples contemplated herein include copolymers of ethylene and one or more $C_3$ to $C_{20}$ α-olefin comonomers, such as $C_4$ to $C_{12}$ α-olefin comonomers (with 1-butene, 1-hexene, 1-octene, or mixtures of two or more of them being preferred in various embodiments). An ethylene copolymer (e.g., a copolymer of ethylene and one or more $C_3$ to $C_{20}$ α-olefins) can include ethylene-derived units in an amount of at least 80 wt %, or 85 wt %, such as at least 90, 93, 94, 95, or 96 wt % (for instance, in a range from a low of 80, 85, 90, 91, 92, 93, 94, 95, 96, or 97 wt %, to a high of 94, 95, 95.5, 96, 96.5, 97, 97.5, or 98 wt %, with ranges from any foregoing low value to any foregoing high value contemplated (provided the high is greater than the low) based on a total amount of ethylene-derived units and comonomer-derived units. For instance, the ethylene copolymer can include 94 or 95 wt % to 97 or 98 wt % ethylene-derived units based on the total amount of ethylene-derived units and comonomer-derived units. The balance of the copolymer (on the basis of ethylene-derived units and comonomer-derived units) is comprised of the comonomer-derived units. For example, comonomer units (e.g., $C_2$ to $C_{20}$ α-olefin-derived units, such as units derived from butene, hexene, and/or octene) may be present in the ethylene copolymer from a low of 2, 2.5, 3, 3.5, 4, 4.5, 5, or 6 wt %, to a high of 3, 4, 5, 6, 7, 8, 9, 10, 15, or 20 wt %, with ranges from any foregoing low to any foregoing high contemplated (provided the high is greater than the low value).

For ethylene-based, propylene-based, or other α-olefin based copolymers, several suitable comonomers were already noted, although in various embodiments, other α-olefin comonomers are contemplated. For example, the α-olefin comonomer can be linear or branched, and two or more comonomers can be used, if desired. Examples of suitable comonomers include linear $C_3$-$C_{20}$ α-olefins (such as butene, hexene, octene as already noted), and α-olefins having one or more $C_1$-$C_3$ alkyl branches, or an aryl group. Examples can include propylene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. In some embodiments, comonomers include propylene, 1-butene, 1-pentene, 4-methyl-1-pentene, 1-hexene, 1-octene and styrene.

In particular embodiments, the polymer can comprise or can be an ethylene copolymer (per those described above). The ethylene copolymer can be produced in gas, slurry, or solution phase polymerization, and some particularly preferred ethylene copolymers can be produced in gas or slurry phase polymerization. A particular example is a linear-low density polyethylene (LLDPE), a copolymer of ethylene and one or more α-olefins polymerized in the presence of one or more single-site catalysts, such as one or more Ziegler-Natta catalysts, one or more metallocene catalysts, and combinations thereof. Such LLDPE can have density within the range from a low of 0.900, 0.905, 0.907, 0.910 g/cm$^3$ to a high of 0.920, 0.925, 0.930, 0.935, 0.940, or 0.945 g/cm$^3$. LLDPE can be distinguished from the above-mentioned LDPE in several respects, many of which are well known in the art, including the degree of branching (sometimes referred to more specifically as long-chain branching) in the produced polymer, noting that LLDPE has substantially less (often little, if any) long chain branching. In particular embodiments, the polymer of the polymer composition is or includes a metallocene -catalyzed LLDPE (mLLDPE).

Further, it may be particularly advantageous to deploy the PEG or PEG-based PPA in a polymer composition comprising one or more polymers (e.g., ethylene homopolymers or copolymers) having particular rheology characteristics. For instance, according to some embodiments, the polymer (e.g., ethylene homopolymers or copolymers) of the polymer composition has MI of 5.0 g/10 min or less, preferably 2.5 g/10 min or less, such as 1.0 g/10 min or less, or within the range from 0.1, 0.2, or 0.5 g/10 min to 1.0, 1.2, 1.5, 2.0, 2.5, 3.0, 4.0, or 5.0 g/10 min (with ranges from any low to any high contemplated).

Melt index ratio (MIR) is another polymer characteristic of potential interest in this regard. MIR is herein defined as the ratio of high load melt index (HLMI) (determined per ASTM D1238 at 190° C., 21.6 kg loading) to melt index, or HLMI/MI. Polymers of some embodiments can have MIR within the range from 10, 12, or 15 to 20, 25, or 30. In yet other embodiments, MIR may be greater than 30, such as within the range from 35 or 37 to 60, 65, 70, 75, 80, 85, 90, 95, or 100. More generally, polymers of MIR within the range from any foregoing low to any foregoing high (e.g., 10 to 65, such as 12 to 60) are contemplated in various embodiments.

Also or instead, density of the polymer may in some embodiments be within the range from 0.905 to 0.945 g/cm$^3$, such as within the range from a low of any one of 0.905, 0.907, 0.908, 0.910, 0.911, 0.912, 0.913, 0.914, or 0.915 g/cm$^3$ to a high of any one of 0.916, 0.917, 0.918, 0.919, 0.920, 0.924, 0.926, 0.930, 0.935, 0.940 or 0.945 g/cm$^3$, with ranges from any foregoing low to any foregoing high contemplated herein (e.g., 0.910 to 0.925 or 0.935 g/cm$^3$, such as 0.912 to 0.925, or 0.915 to 0.918 g/cm$^3$). In yet other embodiments, the polymer may be of higher density (e.g., HDPE), having density within the range from 0.945 g/cm$^3$ to 0.970 g/cm$^3$.

PEG-Based Polymer Processing Aids

The polymer compositions also include a PEG-based PPA; or, put in other terms, the polymer compositions can also include PEG.

It is noted that PEG is a component in some known fluoropolymer-based PPAs (see, e.g., EP3908627 and higher-molecular weight PEG (often referred to as polyethylene oxide or PEO, see below for more details) has been suggested as one among other ingredients such as metal salts of particular acids or alkylsulfate, in other PPAs (see, e.g., EP3234004). However, the present inventors have found particular lower molecular weight varieties of polyethylene glycol are useful as PPAs without other components, especially without fluorine-based components and/or inorganic components such as the aforementioned metal salts. Thus, a PPA of the present disclosure comprises at least 80 wt % PEG, more preferably at least 90 wt % PEG, such as at least 95 wt % or at least 99 wt % PEG; alternatively the PPA may be said to consist or consist essentially of PEG (where "consist essentially of" in this context means that other components are not intentionally included, but allows for trace amounts, e.g., 100 ppm or less, preferably 50 ppm or less, or even 10 or 1 ppm or less, of impurities). More generally, the present inventors have identified suitable processing conditions, suitable varieties of PEG (based, e.g., upon molecular weight), and suitable loadings of PEG-based PPAs in polymer compositions, that individually or collectively can overcome many of the challenges of incorporating PEG-based PPAs into a polymer composition. For instance, PEG has a substantially lower melting temperature than many polymers (e.g., polyethylene homopolymers or copolymers), and therefore can start beading up during attempts to mix this ingredient with such polymers having higher melting point than PEG. This phenomenon can be mitigated or exacerbated depending upon the size (molecular weight) of the PEG, and/or the desired loading of the PEG-based PPA in the polymer; and can affect proper mixing. Furthermore, as a generally hydrophilic compound, PEG's incorporation into generally more hydrophobic polymer compositions can present some challenges, requiring close examination of suitable molecular weight ranges, amounts, and methods of incorporation of PEG-based PPAs into a polymer composition, particularly where the PEG-based PPA comprises a large amount of PEG (80 wt % or more, 90 wt % or more, 99 wt % or more, or substantially all).

As used herein, polyethylene glycol or PEG refers to a polymer expressed as H—(O—CH$_2$—CH$_2$)$_n$—OH, where n represents the number of times the O—CH$_2$-CH$_2$ (oxyethylene) moiety is repeated; n can range widely, because PEG comes in a wide variety of molecular weights. For instance, n can be about 33 for lower-molecular weight polyethylene glycols (~1500 g/mol), ranging up to about 227 for higher molecular weight polyethylene glycols (~10,000 g/mol) such as about 454 for ~20,000 g/mol molecular-weight PEG; and 908 for ~40,000 molecular-weight PEG; and even higher for higher-molecular-weight PEG varieties.

It is also noted that PEG can equivalently be referred to as polyethylene oxide (PEO) or polyoxyethylene (POE). Sometimes in industry parlance, PEG is the nomenclature used for relatively lower molecular weight varieties (e.g., molecular weight 20,000 g/mol or less), while polyethylene oxide or PEO is used for higher-molecular-weight varieties (e.g., above 20,000 g/mol). However, for purposes of the present application, references to polyethylene glycol or PEG should not, alone, be taken to imply a particular molecular weight range, except where a molecular weight range is explicitly stated. That is, the present application may use the terms polyethylene glycol or PEG to refer to a polymer having structure H—(O—CH$_2$—CH$_2$)$_n$—OH with n such that the polymer's molecular weight is less than 20,000 g/mol, and it may also use the terms polyethylene glycol or PEG to refer to such a polymer with n such that the polymer's molecular weight is greater than 20,000 g/mol, such as within the range from 20,000 to 40,000 g/mol.

PEG "molecular weight" as used herein refers to weight-average molecular weight (Mw) as determined by gel permeation chromatography (GPC), and PEG "molecular weight distribution" or MWD refers to the ratio of Mw to number-average molecular weight (Mn), i.e., Mw/Mn. The most preferred PEG compositions for use in PPAs will have narrow MWD, such as within the range from a low of any one of about 1.0, 1.1, 1.2, 1.3, 1.4, or 1.5 to a high of any one of about 1.1, 1.2, 1.3, 1.4, 1.5, 1.6, 1.7, 1.8, 1.9, 2.0, 2.5, or 3.0, with ranges from any foregoing low end to any foregoing high end contemplated, provided the high end is greater than the low end (e.g., 1.0 to 2.0, or 1.0 to 1.5, such as 1.0 to 1.2 or even 1.0 to 1.1). Particularly preferred are PEG compositions having MWD of about 1 to 1.1. However, obtaining such a uniform length of polymer chains (i.e., narrow MWD) can be expensive; more commonly, commercially available PEG compositions might have broader MWD values (e.g., ranging from 1 to 3, 4, 5, or even greater). Such PEG compositions are therefore also within the scope of the invention. These PEG compositions can still suitably be employed as PPAs, potentially (but not necessarily) compensating by increasing the PEG loading for such broader-MWD PEGs (e.g., 700-1400 ppm, as compared to loadings as low as 400-700 ppm for narrower-MWD PEGs). PEG-based PPA loading is discussed in more detail below.

In embodiments employing narrow MWD PEG, Mw values for PEG will commonly be in relatively close agreement with Mn (e.g., within +/−10%); regardless, however, where differences between the two (Mw and Mn) exist, Mw should control as the preferred "molecular weight" measurement for purposes of the present disclosure. It is also noted that many commercial PEG compounds include a nominal molecular weight (e.g., "PEG 3K" or "PEG 10K" indicating nominal 3,000 g/mol and 10,000 g/mol molecular weights, respectively). Again, Mw of the PEG should control over any contrary nominal indicator.

Polyethylene glycols suitable for use in PEG-based PPAs herein generally include PEG of a variety of molecular weights, potentially including PEG having Mw ranging from as low as 500 g/mol to as high as 200,000 g/mol, such as from a low of any one of 500, 600, 700, 800, 900, 1000, 3000, 5000, 7000, or 7500 g/mol to a high of 40000, 50000, 60000, 75000, 80000, 90000, 100000, 125000, 150000, 175000, or 200000 g/mol, with ranges from any low end to any high end contemplated.

In certain embodiments, however, particularly preferred PEGs are those having molecular weight less than 40,000 g/mol; such as within the range from a low of any one of 500, 600, 700, 800, 900, 1000, 1500, 2000, 2500, 3000, 3500, 4000, 4500, 5000, 5500, 6000, 7000, 8000, 8500, 9000, 9500, 10000, 12500, and 15000 g/mol to a high of any one of 7000, 7500, 8000, 8500, 9000, 9500, 10000, 10500, 11000, 11500, 12000, 12500, 15000, 20000, 22000, 25000, 30000, 35000, 39000, and 39500 g/mol, provided the high end is greater than the low end, and with ranges from any foregoing low end to any foregoing high end generally contemplated (e.g., 1,500 to 35,000 g/mol, or 5,000 to 20,000 g/mol, such as 5,000 to 12,000 g/mol or 6,000 to 12,000 g/mol). Particular higher or lower sub-ranges may also be suitable (e.g., PEG having Mw of 1,500 to 5,500 g/mol; or PEG having Mw of 5,000 to 12,000 g/mol; or PEG having Mw of 10,000 to 20,000 g/mol; or PEG having Mw of 15,000 to 25,000 g/mol; or PEG having Mw of 25,000 to 35,000 g/mol).

Further, it is also contemplated that blends of multiple of the aforementioned PEG compounds could form a suitable PPA. For instance, a PEG-based PPA can comprise at least 90 wt %, preferably at least 99 wt %, of a blend of two or more polyethylene glycols, for instance any two or more of: a first PEG having molecular weight within the range from 3,000 to 7,000 g/mol; a second PEG having molecular weight within the range from 5,000 to 12,000 g/mol; a third PEG having molecular weight within the range from 10,000 to 20,000 g/mol; and a fourth PEG having molecular weight within the range from 20,000 to 40,000 g/mol, provided that each of the first, second, third, and fourth PEG of such blends have different molecular weights from the other polyethylene glycol(s) of those blends. And, in some embodiments, a higher-molecular weight PEG could be included in such blend (e.g., one or more PEGs having molecular weight greater than 40,000 g/mol).

However, as noted, it is contemplated that PEG-based PPAs of many embodiments as described herein do not include polyethylene glycol (or polyethylene oxide) having molecular weight greater than 40,000 g/mol. That is, in such embodiments, all or substantially all polyethylene glycol of the polymer compositions has molecular weight less than 40,000 g/mol; such as less than 35,000 g/mol, or less than 33,000 g/mol, or less than 22,500 g/mol, or less than 20,000 g/mol, or less than 12,000 g/mol, such as less than 10,000 g/mol. In this context, "substantially all" means that minor amounts (50 ppm or less, more preferably 10 ppm or less, such as 1 ppm or less) of higher-molecular weight PEG could be included while not losing the effect of including predominantly the lower-molecular-weight PEGs described herein. It is believed that the focus on lower molecular-weight PEG enables generally lower loadings of the PEG-based PPA to achieve the desired elimination of melt fractures across most grades of polymer that might experience melt fracture when formed into blown films. Similarly, lower molecular-weight PEG is believed to diffuse faster to the surface of polymer material being extruded in, e.g., blown film processes, as compared to higher molecular weight varieties of PEG; therefore, the lower molecular-weight PEG varieties will typically lead to faster elimination of melt fracture in blown films (and therefore lower off-spec production). However, it is nonetheless contemplated that higher-molecular weight PEG (e.g., Mw>40,000 g/mol) may be appropriate in some cases for certain polymer grades; hence the contemplation that such higher-molecular weight PEGs may be included in polymer compositions that are still within the spirit and scope of some embodiments of the present invention.

Commercially available examples of suitable polyethylene glycols, especially those of lower molecular weight, include Pluriol® E 1500; Pluriol® E 3400; Pluriol® E 4000; Pluriol® E 6000; Pluriol® E 8000; and Pluriol® E 9000 polyethylene glycols available from BASF (where the numbers represent nominal molecular weights of the PEG); and also include Carbowax™ 8000, Carbowax™ Sentry™ 8000 NF EP available from Dow.

Measuring Moments of Molecular Weight

Unless otherwise indicated, the distribution and the moments of molecular weight are determined by using Agilent 1260 Infinity II Multi-Detector GPC/SEC System equipped with multiple in-series connected detectors including a differential refractive index (DRI) detector, a viscometer detector, a two-angle light scattering (LS) detector and a UV diode array detector. Two Agilent PLgel 5-μm Mixed-C columns plus a guard column are used to provide polymer separation. THF solvent from Sigma-Aldrich or equivalent with 250 ppm of antioxidant butylated hydroxytoluene (BHT) is used as the mobile phase. The nominal flow rate is 1.0 ml/min and the nominal injection volume is 25 μL. The whole system including columns, detectors and tubings operates at 40° C. The column calibration was performed by using twenty-three polystyrene narrow standards ranging from 200 to 4,000,000 g/mole.

The Agilent Multi-Detector GPC Data Analysis Software is used to process data from any combination of DRI, light scattering and viscometer detectors to obtain information about polymer properties. Here, the light scattering MW is calculated by combining the concentration measured by DRI and the Rayleigh ratio measured by LS in each elution volume slice plus the detector calibration constants and polymer parameters such as refractive index increment (dn/dc). For the poly (ethylene glycol) samples used in the patent, the dn/dc is determined to be around 0.07 ml/g in THF solvent.

Amounts of PEG-Based PPA and Polymer Properties

The polyethylene glycol (or PEG-based PPA) can be deployed in the polymer composition in amounts of at least 200 ppm, such as at least 250 ppm, at least 300 ppm, at least 400 ppm, at least 500 ppm, or at least 600 ppm. For instance, it can be deployed in an amount within a range from a low of any one of 200, 250, 300, 350, 400, 450, 500, 550, 600, 650, 700, 750, 800, 900, 950, 1000, 1100, 1200, 1250, and 1500 ppm to a high of any one of 400, 500, 600, 700, 800, 900, 1000, 1100, 1200, 1300, 1400, 1500, 1600, 1700, 1800, 1900, 2000, 2500, 3000, 3500, 4000, 4500, 5000, 7500, 10000, 12500, and 15000 ppm, with ranges from any foregoing low to any foregoing high contemplated, provided the high end is greater than the low end (e.g., 300 to 15,000 ppm, such as 300 to 2,000 ppm; or 500 to 1500 ppm, such as 500 to 1200 ppm, or 600 to 1200 ppm). The ppm values can apply for either polyethylene glycol included in a polymer composition; or to PEG-based PPA included in the polymer composition, in various embodiments. Further, the ppm values recited herein for polyethylene glycol (or PEG-based PPA), as well as any other additives described herein, are all based on mass of the polymer composition (i.e., inclusive of polymer plus PPA, as well as any and all other additives in the polymer composition), unless otherwise specifically noted. Amounts of PPA in a polymer composition can most readily be determined using mass balance principles (e.g., PPA amount is determined as mass of PPA added to a polymer composition, divided by (mass of PPA plus mass of polymer plus mass of any other additives blended together to form the polymer composition)). NMR analysis could be used to determine the PPA content of an already-mixed polymer composition (e.g., polymer pellet(s) comprising the polymer and PPA), but where there is a discrepancy between the two methods (mass balance and NMR), the mass balance method should be used.

Furthermore, the present inventors have found surprisingly that PEG molecular weight can affect optimal loading amounts. Specifically, higher-molecular weight PEG eliminates melt fracture faster at lower loading as compared to lower-molecular weight PEG; and at the same time, higher loading of higher-molecular weight PEG can in fact lead to slower melt fraction elimination in films made using the polymer composition comprising the PEG-based PPA. On the other hand, significantly lower-molecular weight PEG variants can require higher loadings, while lower loadings of these PEG varieties can take excessively long to eliminate melt fracture (or fail to eliminate it entirely). The cutoff between these opposing trends appears to take place somewhere in the range of 7,500-11,000 g/mol molecular weight, with the 7,500-11,000 g/mol region representing a transition area where neither trend is excessively pronounced. Thus, such that PEG having Mw less than 7,500 g/mol is in general best employed at higher loading (e.g., 1000, 1100, or 1200 ppm to 2000 or more ppm), while PEG having Mw 11,000 g/mol or greater is better employed at moderate or low loading (e.g., 200-500, 600, 700, 800, 900, or 1000 ppm). The picture is somewhat further complicated, however, so the solution is not necessarily as simple as preferentially selecting higher molecular-weight PEG. In particular, as described herein, certain grades of polymers can require higher loading of PEG (regardless of molecular weight) as polymer rheology also affects performance of PEG in eliminating melt fracture from blown films made from the polymer. Therefore, employing higher molecular-weight PEG can lead to the pitfall of grade-specific loading variations, where accidentally loading too much PEG can detrimentally impact performance in some cases while improving it in others.

Applying these trends generally, we first see a set of embodiments employing lower molecular-weight PEG combined with relatively higher loading levels. That is, the polymer composition of some embodiments comprise PEG (or a PEG-based PPA) in which the PEG(s) of the polymer composition has/have Mw less than 7,500 g/mol (e.g., within the range from 95 g/mol to less than 8,000 g/mol, such as from 95, 100, 500, or 600 g/mol to 1000, 3000, 4000, 5000, 6000, 7000, or 7250 g/mol); and further in which the total amount of PEG in the polymer composition is within the range from a low of any one of 800, 850, 900, 950, or 1000 ppm to a high of any one of 1200, 1250, 1300, 1400, 1500, 1600, 1700, 1800, 1900, 2000, 2500, 3000, 3500, 4000, 4500, or 5000 ppm, with ranges from any foregoing low end to any foregoing high end also contemplated (e.g., 800 or 900 ppm to 2000 ppm, such as 950 ppm to 1700 ppm or 1000 ppm to 1500 ppm).

And second, is a set of embodiments employing relatively higher molecular-weight PEG combined with relatively lower loading levels. That is, the polymer composition can comprise PEG (or a PEG-based PPA) in which the PEG(s) of the polymer composition has/have Mw greater than 11,000 g/mol (such as within the range from greater than 11,000 g/mol to 35,000 or 40,000 g/mol, such as from a low end of any one of >11000, 11500, 12000, 12500, or 14000, to a high end of any one of 15000, 16000, 17500, 20000, 25000, 30000, 35000, or 40000 g/mol); and further in which the total amount of PEG in the polymer composition is within the range from a low of any one of 200, 250, or 300 ppm to a high of 300, 350, 400, 425, 450, 500, 600, 700, 750, 800, 1000, or 1100 ppm). Thus, a particular example is shown wherein the PEG(s) of the polymer composition have Mw within the range from 11000 to 20000 g/mol, and the total amount of PEG in the polymer composition is within the range from 200 to 800 ppm.

Moreover, as noted, the preferred PEG loading ranges may further need to be tailored based upon the properties of the polymer to which the PEG-based PPA is deployed, and in particular the rheological properties of the polymer. For instance, a polymer (e.g., a metallocene catalyzed linear low density ethylene copolymer) having lower MI and/or higher MIR may call for a higher loading of PEG—even of the higher-Mw varieties of PEG just discussed. For instance, where MI is less than 0.45 g/10 min (190° C., 2.18 kg) (and optionally further where MIR is greater than 30), loadings of 700 ppm or higher, even up to 1000 or 1100 ppm, even of a higher-Mw variety PEG, may be required.

Given the complexity of encountering potential diminishing returns in melt fracture elimination at higher PEG loadings for higher-Mw PEG varieties in some polymers, while requiring higher PEG loadings for other polymers (e.g., of the low MI variety), some embodiments herein emphasize simplicity, in particular by targeting a PEG having Mw in the middle range of the above-observed phenomenon (e.g., Mw within the range from 7500 to 11000 g/mol, such as from 7500 to 9000 g/mol or from 9000 to 11000 g/mol). This enables a robust tailoring of PEG loading to the polymer, while at the same time avoiding the concern of substantial loss in performance when moving to higher loadings, as is sometimes observed with higher molecular-weight PEG; e.g., for polymers having MI less than 0.45 g/10 min (190° C., 2.18 kg) (and optionally further having MIR greater than 30), a PEG-based PPA can be deployed such that the PEG(s) of the PEG-based PPA have Mw within the range from 7500 to 9000 or 11000 g/mol; and are present in the polymer composition within the range from 700 ppm, 800 ppm, or 900 ppm to 1100 ppm. And for polymers permitting lower PEG loading (e.g., MI greater than or equal to 0.45 g/10 min (190° C., 2.18 kg)), the PEG-based PPA having PEG(s) such that Mw of the PEG(s) is within the range from 7500 to 9000 or 11000 g/mol will permit lower loadings (e.g., 200 or 250 ppm to 400, 500, or 600 ppm of PEG in the polymer composition).

A similar benefit of simplicity can be achieved with lower-Mw PEG varieties of some of the embodiments mentioned above (that is, increased loading tends to result in increased performance, without having to account as strictly for the polymer rheology). And, while higher-Mw PEG varieties of other embodiments mentioned above may introduce some added complexity in balancing against polymer rheology, they still bring their own substantial benefits in the form of generally lower required loadings. Accordingly, the present disclosure in general encompasses all such classes of PEG with their varying benefits; the skilled artisan with the benefit of the present disclosure will readily be able to select the most suitable PEG varieties from among these for a given desired PPA.

Methods of Introducing PEG-Based PPA to Polymer Compositions

Methods in accordance with various embodiments include adding polyethylene glycol and/or a PEG-based PPA (according to the above description) to a polymer product (e.g., polymer granules and/or slurry) exiting a polymerization reactor to form a pre-finished polymer mixture in or upstream of a compounding extruder. The pre-finished polymer mixture therefore includes the polymer and PEG-based PPA (both per above respective descriptions), as well as any optional other additives (which may be provided to the mixture along with, before, or after the PEG-based PPA). The pre-finished polymer mixture may, for example, be a polymer melt (e.g., formed in or just upstream of a compounding extruder). The mixture is then extruded and optionally pelletized to form a further polymer composition (e.g., polymer pellets) comprising the PEG-based PPA and polymer (each per above, and with the PEG or PEG-based PPA in amounts in accordance with the above discussion), as well as any optional other additive(s).

Also or instead, methods may include mixing finished polymer (e.g., polymer pellets) with PEG or PEG-based PPA to form a polymer article mixture; and processing the polymer article mixture to form a film. Such processing may be in accordance with well-known methods in the art, and in particular in accordance with blown film extrusion.

Returning to embodiments related to compounding extrusion (e.g., as part of a finishing process to produce the polymer composition), methods in accordance with the present disclosure may be employed to line-up proper PEG dosing with different polymer grades, e.g., as may be produced as part of a polymer production campaign.

Such methods can include: at a first time, obtaining a first polymer reactor product from a polymerization reactor, the polymer reactor product having a first MIR and first MI; mixing a first portion of a PEG-based PPA with the first polymer reactor product in a first PEG amount (the PEG-based PPA being such that PEG(s) in the PPA have Mw within the range from 7500 to 11000 g/mol) to form a first pre-finished polymer mixture; and extruding and optionally pelletizing the first pre-finished polymer mixture, thereby obtaining a first product comprising first finished polymer (e.g., first polymer pellets). Further, at a second time after the first time, a second polymer reactor product having second MI lower than the first MI (optionally, also or instead having MIR greater than the first MIR) is obtained from the polymerization reactor; and a second portion of the PEG-based PPA is mixed with the second polymer reactor product in a second PEG amount that is greater than the first PEG amount. This forms the second pre-finished polymer mixture, which is extruded and optionally pelletized to form the second product comprising second finished polymer (e.g., second polymer pellets).

In methods of such embodiments, either or both of the first pre-finished polymer mixture and the first finished polymer product can be in accordance with the polymer compositions (comprising polymer and PEG-based PPA) discussed herein. Likewise, either or both of the second pre-finished polymer mixture and the second finished polymer product can also be in accordance with the polymer compositions discussed herein. In particular, the polymer may be in accordance with those discussed above, such as ethylene homopolymers or copolymers.

In particular embodiments, the first polymer reactor product has MI greater than 0.45 g/10 min, and the second polymer reactor product has MI less than 0.45 g/10 min. Optionally, the first polymer reactor product can have MIR less than 45; and the second polymer reactor product can have MIR greater than 45. Further, the first PEG amount can be within the range from 200, 300, or 400 ppm to 500, 600, 700, or 750 ppm; and the second PEG amount can be within the range from 1000 ppm to 3000 ppm, such as from 1000, 1100, or 1200 to 1600, 1800, 2000, 2500, or 3000 ppm.

The above methods and any other methods of mixing the PEG (or PEG-based PPA) with polymer to form a polymer composition as described herein, also include adequately mixing the PEG into the polymer. The present inventors have surprisingly found that not all methods of mixing PEG may be sufficient; instead, the PEG (or PEG-based PPA) should be melt blended at sufficiently high temperature and/or specific energy input (total mechanical energy forced into a polymer per unit weight, e.g., J/g, a metric for extent of mixing) with the polymer to achieve adequate homogenization among PEG and polymer. For instance, melt-is blending such as through melting and then co-extrusion of the PEG and polymer (e.g., in a compounding extruder) under elevated temperature (e.g., 150° C. or more, such as 200° C. or more) can achieve adequate homogenization, while simply melting the PEG and tumble-blending with polymer does not achieve adequate homogenization. Thus, methods of various embodiments include mixing the PEG and polymer (e.g., polyethylene) in a manner that ensures both components melt during the mixing (e.g., melt-mixing, coextrusion in a compound extruder). Preferred methods according to some embodiments include melt-blending and coextruding the PEG and polymer (and optional other additives) in a compound extruder, and pelletizing the mixture upon its exit from the extruder, thereby locking the homogenously blended mixture in place. More specifically, such methods can include: (a) feeding a PEG composition and a polymer (e.g., polyethylene) into an extruder (optionally with other additives); (b) coextruding the PEG composition and polymer in the extruder at an elevated temperature suitable for melting both the PEG and the polymer (e.g., 200° C. or higher); and (c) pelletizing the extrudate to form the polymer composition comprising the PEG-based PPA. Preferably, the extrusion is carried out under oxygen-poor atmosphere (e.g., nitrogen atmosphere).

Relatively lower-molecular weight PEG (e.g., Mw of 40,000 g/mol or less, such as 20,000 g/mol or less) can present some handling challenges due to lower melting points; however, these are readily overcome by deploying the PEG as a PEG masterbatch where necessary for better handling (e.g., for delivery as a solid additive to compounding extruder in a polymer finishing process). Such PEG masterbatches comprise PEG and a carrier resin. In general, a PEG masterbatch can be used in place of PEG in any PEG-based PPA composition described herein, such that the equivalent final loading of PEG in the PEG-based PPA composition (and thus, loading of PEG in the polymer composition) is maintained. Thus, a PEG masterbatch having 4 wt % PEG loading can be deployed at 25,000 ppm (2.5 wt %) in a polymer composition to target 1000ppm loading of PEG in the polymer composition. The ordinarily skilled artisan will readily be able to recognize PEG masterbatch loading required to achieve desired overall PEG loading in the polymer composition in accordance with the description above of preferred PEG loadings.

Furthermore, as just noted, the PEG masterbatch comprises lower-molecular weight PEG. Thus, preferred PEG molecular weight limits as discussed previously apply equally to embodiments in which a PEG masterbatch is employed (e.g., such that all PEG in the PEG masterbatch, and thus all PEG in the polymer composition, has Mw less than 40,000 g/mol; such as less than 35,000 g/mol, or less than 33,000 g/mol, or less than 22,500 g/mol, or less than 20,000 g/mol, or less than 12,000 g/mol, such as less than 10,000 g/mol). And, PEG molecular weight may preferably be within the range from 7500 to 11000 g/mol as just discussed in connection with a simplified PEG deployment strategy.

The carrier resin can be any suitable olefinic homopolymers or copolymer, although preferred carrier resins will be generally compatible with the polymers targeted in a given production campaign. That is, for a production campaign of ethylene-based polymers, an ethylene-based carrier resin (e.g., having at least 50 wt % units derived from ethylene) is preferred; while for a production campaign of propylene-based copolymers, such as propylene-ethylene elastomers, a propylene-ethylene copolymer carrier resin, or other propylene-based carrier resin (having at least 50 wt % units derived from propylene) would be preferred. Moreover, the carrier resin is preferably relatively easy to process, i.e., having melt index (MI, measured at 190° C. and 2.16 kg loading) of 0.8 g/10 min or greater, such as 1.0 g/10 min or greater, or 1.5 g/10 min or greater. In some instances, however, too great a melt index may detrimentally impact final polymer composition properties. Furthermore, excessively high MI in the carrier resin can cause immiscibility with the polymer composition to which the masterbatch is being added. Thus, the carrier resin may have MI within the range from 0.8 or 1.0 or 1.5 g/10 min to 4.0, 4.5, 5.0, 7.5, or 10.0 g/10 min. Particular examples include polyethylene having such MI. Ethylene copolymers are suitable examples of such polyethylene, such as metallocene-catalyzed copolymers of ethylene and one or more of 1-butene, 1-hexene, and 1-octene, known as mLLDPE (metallocene linear low density polyethylene), e.g., Exceed™ performance polyethylene from ExxonMobil, such as Exceed 1018 or Exceed 2018. Other examples include Ziegler-Natta catalyzed LLDPE (ZN-LLDPE), such as copolymers of ethylene and 1-butene, 1-hexene, and/or 1-octene, as catalyzed by Ziegler Natta catalysts (such polymers typically having broader molecular weight distribution, Mw/Mn, as compared to metallocene-catalyzed counterparts). Yet further suitable examples include low density polyethylene (LDPE) as may be produced from free radical polymerization, particularly a high pressure polymerization process.

PEG loading in the masterbatch can be adjusted as needed, and the ordinarily skilled artisan will readily recognize the inverse relationship between PEG loading in the PEG masterbatch, and amount of masterbatch to be deployed in a polymer composition in order to achieve target PEG loading in the polymer composition (e.g., as the PEG masterbatch comprises more PEG, correspondingly less PEG masterbatch need be loaded into the polymer composition). For sake of illustration, example loadings of PEG in PEG masterbatch include PEG within the range from a low of 1, 2, 3, 4, or 5 wt % to a high of 5, 6, 7, 8, 9, 10, 20, 25, 30, 35, 40, 45, or 50 wt %, with ranges from any foregoing low end to any foregoing high end contemplated (provided the high end is greater than the low end). However, it is preferred to keep PEG loading in the masterbatch relatively lower (e.g., within the 1-20 wt % range, such as 1-10 wt %, or 2 to 7 wt %), particularly for PEG having Mw within the range from 7500 to 11,000 g/mol. Thus, a PEG masterbatch comprising 4 wt % PEG (on basis of mass of masterbatch) may be deployed at 2.5 wt % loading (25000 ppm), on the basis of mass of the polymer composition, to maintain 1000ppm PEG loading the polymer composition; and deployed at 5.0 wt % loading (50000 ppm), on the basis of mass of the polymer composition, to maintain 2000 ppm PEG loading in the polymer composition.

Other Additives

As noted, other additives optionally can also be present in the polymer composition (e.g., antioxidants, stabilizers such as UV stabilizers, catalyst neutralizers, and other additives known in the art of polymerization). Where such additives are employed, they are also preferably free or substantially free of fluorine. Further, it is reiterated that where other additives are present, the mass of such additives is included in the denominator for determining the ppm loading amounts for PEG-based PPA described herein (that is, the ppm loading is on the basis of total mass of polymer+PPA+other additives).

According to various embodiments, it may be advantageous to employ an additive package including antiblock and/or slip agents, potentially along with other additives. In particular as regards antiblock and slip agents, data indicate these may provide a potential advantage of quicker melt fraction elimination when employed with the PEG-based PPA. Examples of antiblock agents are well known in the art, and include talc, crystalline and amorphous silica, nepheline syenite, diatomaceous earth, clay, or various other anti-block minerals. Particular examples include the Optibloc agents available from Mineral Technologies. Examples of slip agents for polyolefins include amides such as erucamide and other primary fatty amides like oleamide; and further include certain types of secondary (bis) fatty amides.

Antiblock agent loading is often around 500 to 6000 ppm, such as 1000 to 5000 ppm; slip agent loading is typically 200 to 1000, 2000, or 3000 ppm. Other can include, for example: fillers; antioxidants (e.g., hindered phenolics such as IRGANOX™ additives available from Ciba-Geigy); phosphites (e.g., IRGAFOS™ compounds available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; release agents; anti-static agents; pigments; colorants; dyes; waxes; silica; fillers; talc; mixtures thereof, and the like.

Films

As noted, a significant reason for employing PPAs is to eliminate melt fracture in blown films. Ideally, when replacing incumbent PPAs with the PEG-based PPA of the present disclosure, films made from polymer compositions including such PEG-based PPA will exhibit similar or superior properties as compared to films made using polymer compositions comprising conventional PPA.

Thus, the invention of the present disclosure can also be embodied in a film made from any of the above-described polymer compositions (and in particular, polyethylene compositions) comprising the polymer and 250 to 15000 ppm (such as 250 to 11000 ppm) of the PEG-based PPA (e.g., such that PEG(s) in the PPA have Mw less than 40,000 g/mol, such as within the range from 3000, 4000, 5000, 6000, or 7500 g/mol to 11000, 15000, 20000, or 35000 g/mol), and preferably being substantially free of fluorine; wherein the film has one or more of (and preferably all of):

1% secant modulus (MD) within +/−5% psi, preferably within +/−1% psi, of the value (psi) of a film that is made using a fluoropolymer-based PPA instead of the PEG-based PPA, but is otherwise identical;

Elmendorf tear (MD) within +/−10% g, preferably within +/−5% g, of the value (g) of a film that is made using a fluoropolymer-based PPA instead of the PEG-based PPA, but is otherwise identical;

Total haze within +/−25%, preferably within +/−10%, of the value (in %) of a film that is made using a fluoropolymer-based PPA instead of the PEG-based PPA, but is otherwise identical, and/or total haze less than 6%;

Gloss (MD) within +/−12%, preferably within +/−10%, of the value (in GU) of a film that is made using a fluoropolymer-based PPA instead of the PEG-based PPA, but is otherwise identical; and Dart within +/−1%, preferably within +/−0.5% or even within +/−0.1%, of the value (g) of a film that is made using a fluoropolymer-based PPA instead of the PEG-based PPA, but is otherwise identical.

In the discussion above, a film "made using a fluoropolymer-based PPA instead of the PEG-based PPA, but is otherwise identical" is intended to mean that a film made using an effective amount of PEG-based PPA is compared against a film made using an effective amount of fluoropolymer-based PPA; not necessarily that the same amount of each PPA is used. An effective amount is such that visible melt fractures are eliminated from the film, consistent with the discussion in connection with Example 1.

EXAMPLES

To facilitate a better understanding of the embodiments of the present invention, the following examples of preferred or representative embodiments are given.

Blown film trials were conducted on two blown film extruder lines, L1 and L2, to demonstrate a general usage of the inventive PPA formulations. Both lines were operated using a mono film annular die with the following conditions: a blowup ratio of 2.5, a die temperature set point of 390° F., a film gauge of 3 mil, a die gap of 30 mil, and a frost line height of approx. 5 times the die diameter. L1 has a die diameter of 160 mm, while L2 has a die diameter of 51 mm.

Example 1

Initially for preparing for the trials on line L1, the L1 film line extruder was fed with a blend of a preceding polyethylene with Polybatch® KC 30 (a polyethylene-based cleaning and purging compound from A. Schulman, Inc.) in a 2:1 weight ratio (of preceding PE to KC 30 cleaning compound) for at least 30 minutes. The purpose of this initial step was to remove contaminants and potential PPAs from the metal surfaces inside the extruder and die. For all examples, the preceding polyethylene used in this step is the PPA-free version of the same polyethylene used in connection with the PPAs investigated herein. In all runs in connection with this Example 1, the mLLDPE used was Exceed™ 1018 polyethylene, an ethylene-hexene copolymer available from ExxonMobil Chemical Company having 0.918 g/cm$^3$ density and 1.0 g/10 min MI, with MIR of 16.

Second, the film line was stopped and the inner die was manually polished to remove the KC 30 material.

Third, the inner die was reinserted and the line was resumed with a pure feed of the same preceding mLLDPE material for 1 hour, until residual KC 30 was removed and melt fracture developed on the entirety of the film surface made from the mLLDPE. Fourth, a conventional fluoropolymer-containing PPA (DYNAIVIAR™ FX5929M) was fed to the extruder at constant mass flow rate which matched the mass flow rate of the mLLDPE. As PPA was fed, the melt fractures slowly began to disappear in streaks as illustrated in FIG. 1. With reference to FIG. 1, as the PPA is added, melt fracture-free regimes begin to emerge as stripes 101 in the machine direction 110 of the film 100 (that is, the direction in which the film is extruded and blown). FIG. 1 is a schematic conceptually illustrating this transitory period with 105 of melt-fractured film material, and the stripes 101 of melt fracture-free film. Over time, these stripes 101 grow in width and the melt fracture zones diminish, and are eventually eliminated completely. This trial, using the mLLDPE noted and the conventional PPA, is denoted as C1 in Table 1 below. Table 1 summarizes the PPA and mLLDPE used in each trial (with the PPA-free version of that mLLDPE used as the preceding material in each case, as outlined above), further noting that outputs of all trial films normalized for annular die circumference (lbs/hr.-in. die) were maintained within +/−30% of each other.

The process was repeated for trial run I23, which took place in the same manner as described above for trial run C1, and using the same mLLDPE, except the inventive PEG-based PPA (in this case, Pluriol® E 8000, generically labeled as PEG 8K) was used at the amount indicated in Table 1, instead of the conventional PPA used in trial run C1. And the process was again repeated for trial runs I25 and I26, all on line L1 as indicated in Table 1 below, with increasing amounts of PEG 8K as also indicated in Table 1. This sequence was repeated for trial run C2 (conventional PPA) and inventive runs I27-I30 on line L2, also as indicated in Table 1 below. Table 1 further indicates the results of each trial run: melt fracture@ 100 min (% of area of the film) and time to melt fracture elimination (in min), with faster times of course being better.

TABLE 1

Inventive and comparative examples on Lines L1 and L2 for Example 1 (PEG 8K)

| ID | PPA | Film Line | Melt fract. @ 100 min (%) | Time to Melt fract. elimination (min) | Initial extruder pressure (psi) | Final extruder pressure (psi) |
|---|---|---|---|---|---|---|
| C1 | 400 ppm reference | L1 | 0 | 22 | 7900 | 6370 |
| I23 | 250 ppm PEG 8K | L1 | 80 | N/A | 7900 | 7160 |
| I24 | 500 ppm PEG 8K | L1 | 7 | N/A | 7690 | 7150 |
| I25 | 750 ppm PEG 8K | L1 | 0 | 52 | 7520 | 6730 |
| I26 | 1000 ppm PEG 8K | L1 | 0 | 37 | 7860 | 6660 |
| C2 | 400 ppm reference | L2 | 0 | 103 | 5400 | 4080 |
| I27 | 250 ppm PEG 8K | L2 | 2 | N/A | 5330 | 4860 |
| I28 | 500 ppm PEG 8K | L2 | 0 | 42 | 5255 | 4745 |
| I29 | 750 ppm PEG 8K | L2 | 0 | 85 | 5350 | 4650 |
| I30 | 1000 ppm PEG 8K | L2 | 0 | 61 | 5425 | 4800 |

For each trial run, the time at which PPA feed was begun was recorded as time T=0, and extent of melt fracture on each extruded film was observed as a percentage of the surface area of the film including melt-fracture streaks (see FIG. 1 and discussion above) versus duration of PPA feed.

Figure 2A:
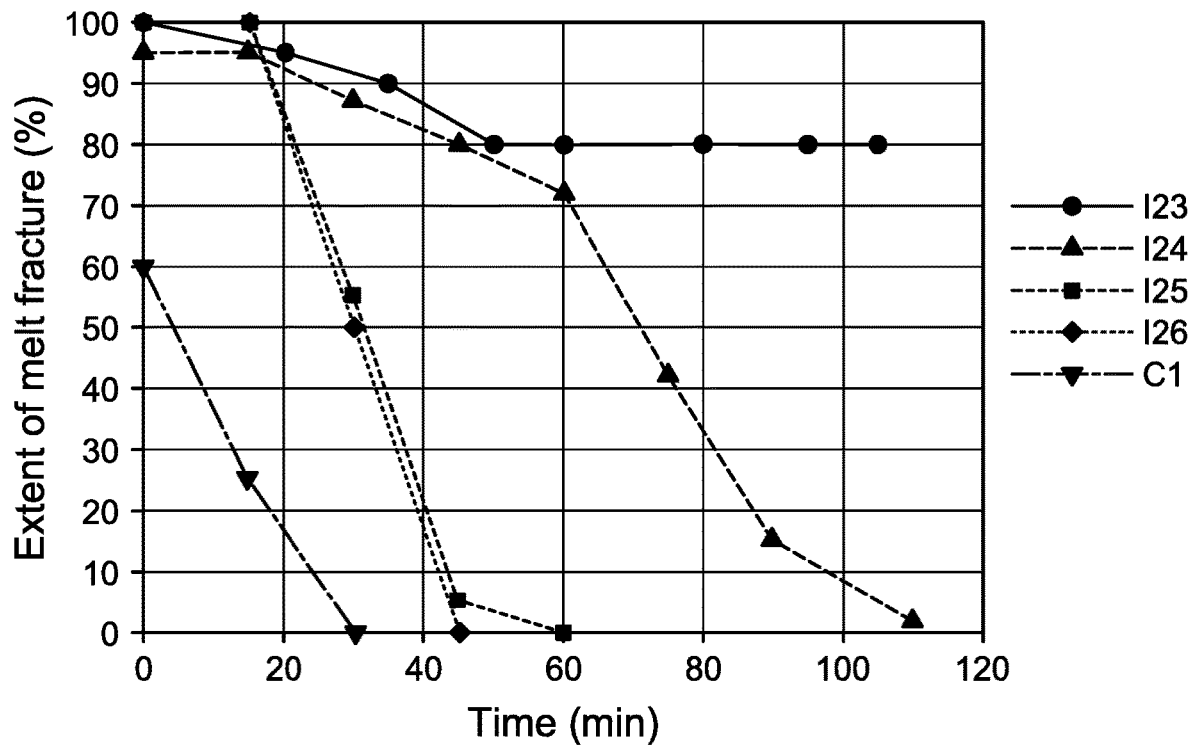
FIG. 2A is a graph showing extent of melt fracture over time in blown films made using various PPAs in connection with some trial runs of the Examples.
Figure 2B:
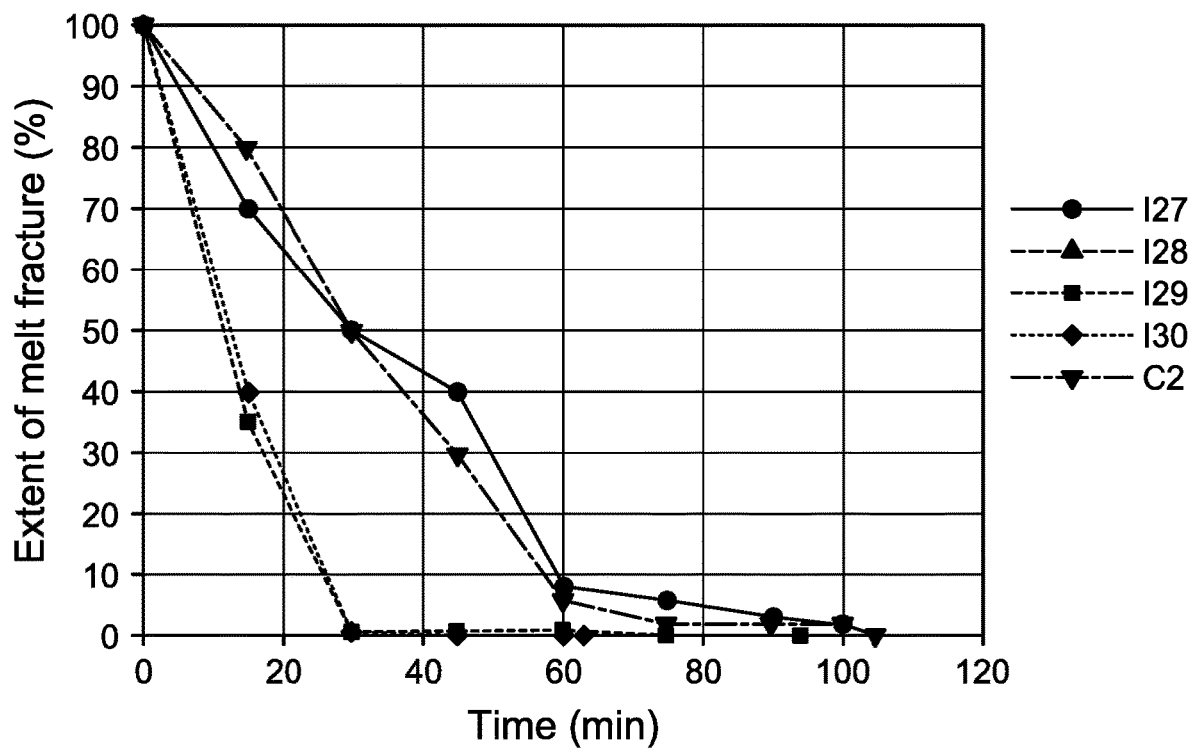
FIG. 2B is a graph showing extent of melt fracture over time in blown films made using various PPAs in connection with further trial runs of the Examples.

FIGS. 2A and 2B are each a plot showing the extent of melt fracture (starting at 100% and, ideally, progressing to 0%) as a function of time after time T=0 (i.e., as a function of time after PPA feed was resumed to the extruder), for the Example 1 trials in connection with lines L1 and L2, respectively. In this manner, effectiveness of the PPAs could be judged in eliminating melt fracture in the resulting blown films. From FIGS. 2A and 2B, it can be seen that I26 and I25 (having 750 ppm and 1000 ppm PEG 8K, respectively) compare favorably to the melt fracture elimination achieved with the conventional PPA on the L1 line. It is also noted that, as can be seen in FIG. 2A, C1 does not start at 100% melt fracture; this is due to a material shortage in running this example, such that full melt fracture was unable to be developed. It is expected that, if anything, this skews the result in favor of C1, meaning that at higher loadings (e.g., 1000 ppm), PEG 8K can be expected to match the performance of the incumbent PPA used in C1.

Surprisingly, on the L2 line, the PEG 8K actually outperformed the conventional PPA at these same loadings (see I28, I29 and I30, for 500, 750 and 1000 ppm PEG 8K, respectively). It is hypothesized that this may be due in part to faster diffusivity of the PEG 8K compared to conventional PPA, having a more pronounced effect on speed of melt fracture reduction when extruding at lower specific outputs.

Example 2

To test whether PEG can have different PPA characteristics at different molecular weights, the melt fracture elimination was characterized on compounding extruder line L2 (see description in Example 1) not only using the commercial PEG 8K as a PPA, but also using narrowly-dispersed PEG compositions at different molecular weights, obtained from Millipore-Sigma. Each PEG composition's molecular weight distribution was measured by gel permeation chromatography and summarized in Table 2. The non-commercial samples are indeed narrowly-distributed, allowing for a clear molecular weight trend to be discerned. The two shorter chains, labeled nominally as PEG 1.5K and PEG 3K, were measured instead at about 100 and 600. These measured values were more likely closer to the true value, but the seriatim of the five samples was preserved anyway so general conclusions were not affected by this discrepancy. Further, the same mLLDPE as in Example 1 is also used in these Example 2 runs (Exceed™ 1018 ethylene-hexene copolymer).

TABLE 2

Number (Mn) and weight (Mw) averaged molecular weight for each PEG sample by gel permeation chromatography.

| Label | Mn | Mw |
|---|---|---|
| PEG 1.5K | 1332 | 1432 |
| PEG 3K | 2529 | 2975 |
| PEG 8K | 8267 | 8394 |
| PEG 10K | 9387 | 9403 |
| PEG 20K | 19948 | 20077 |
| PEG 35K | 31490 | 31532 |

Table 3 summarizes the performance of the various PEG-based PPAs (noting that each is labeled per its nominal molecular weight) at different loadings, as indicated for each trial run listed in Table 3. Output rates (lbs/hr-in. die) were again within +/−30% of each other.

TABLE 3

Inventive and comparative examples for PEG of various molecular weights on L2.

| ID | PPA | Melt fracture @ 100 min (%) | Time to Melt fracture elimination (min) | Initial extruder pressure (psi) | Final extruder pressure (psi) |
|---|---|---|---|---|---|
| C2 | 400 ppm reference | 0 | 103 | 5400 | 4080 |
| I3 | 300 ppm PEG 1.5K | 3 | N/A | 5280 | 4410 |
| I4 | 600 ppm PEG 1.5K | 0.1 | 110 | 5190 | 3700 |
| I5 | 1000 ppm PEG 1.5K | 0 | 65 | 5220 | 3420 |
| I6 | 1500 ppm PEG 1.5K | 0 | 65 | 5220 | 3400 |
| I7 | 300 ppm PEG 3K | 11 | N/A | 5280 | 4720 |
| I8 | 600 ppm PEG 3K | 0 | 95 | 5280 | 4210 |
| I9 | 1000 ppm PEG 3K | 0 | 80 | 5310 | 3820 |
| I10 | 1500 ppm PEG 3K | 0 | 52 | 5360 | 3745 |
| I11 | 300 ppm PEG 10K | 0 | 37 | 5390 | 4540 |
| I12 | 600 ppm PEG 10K | 0 | 82 | 5390 | 4320 |
| I13 | 1000 ppm PEG 10K | 0 | 52 | 5340 | 4250 |
| I14 | 1500 ppm PEG 10K | 0 | 52 | 5430 | 4010 |
| I15 | 300 ppm PEG 20K | 0 | 22 | 5480 | 4760 |
| I16 | 600 ppm PEG 20K | 0.5 | N/A | 5400 | 4315 |
| I17 | 1000 ppm PEG 20K | 0.2 | N/A | 5470 | 4330 |

TABLE 3-continued

Inventive and comparative examples for
PEG of various molecular weights on L2.

| ID | PPA | Melt fracture @ 100 min (%) | Time to Melt fracture elimination (min) | Initial extruder pressure (psi) | Final extruder pressure (psi) |
|---|---|---|---|---|---|
| I18 | 1500 ppm PEG 20K | 0 | 52 | 5530 | 3942 |
| I19 | 300 ppm PEG 35K | 0 | 22 | 5660 | 4570 |
| I20 | 600 ppm PEG 35K | 0 | 50 | 5530 | 4450 |
| I21 | 1000 ppm PEG 35K | 0 | 52 | 5450 | 4120 |
| I22 | 1500 ppm PEG 35K | 0 | 77 | 5500 | 4050 |

Figure 3A:
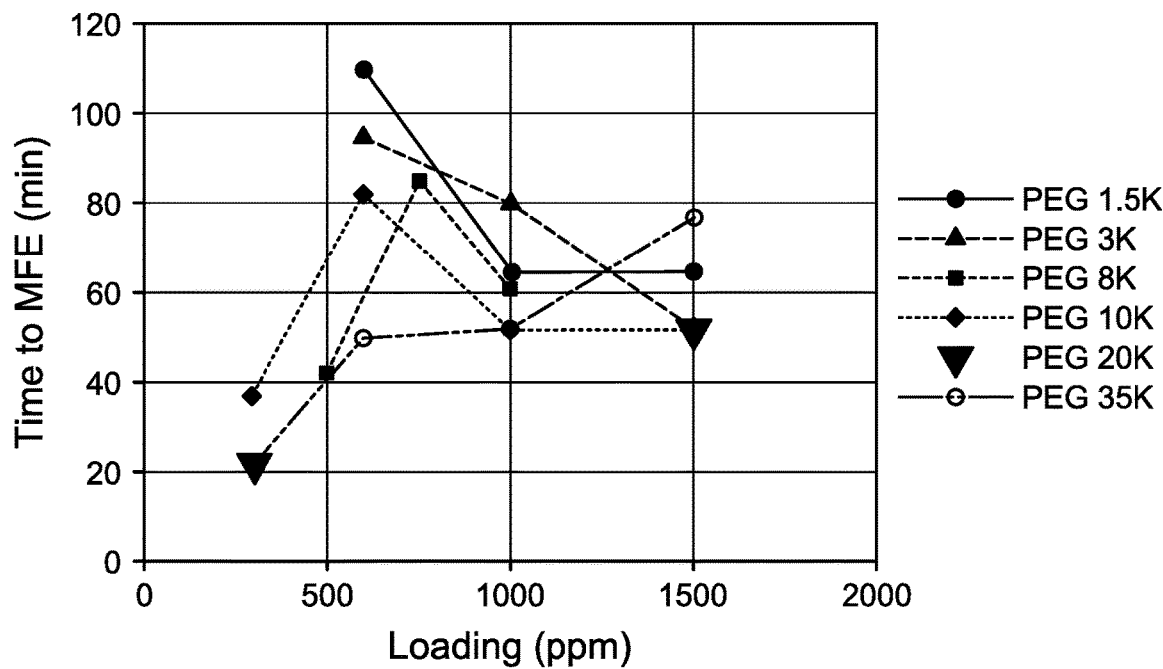
FIG. 3A is a graph showing time to melt fracture elimination vs. loading (ppm) of PEG-based PPAs in connection with some of the Examples.

The Table 3 data viewed in combination with the Table 1 data of Example 1 demonstrate a sensitivity in melt fracture elimination to molecular weight of the PEG employed. This is more clearly illustrated in FIG. 3A, which illustrates time to melt fracture elimination vs. loading level for the different molecular-weight PEGs investigated in Examples 1 and 2. It appears that for low molecular weight PEG, melt fracture elimination time decreases with loading level, but for high molecular weight PEG, this time generally increases with loading level instead (and, for PEG 20k, actually failed to achieve complete melt fracture elimination at 600 ppm and 1000 ppm loadings for the 100 min duration of the test, while quickly achieving elimination at only 300 ppm loading). Intermediate molecular weights, with Mw 7500 to 11000 (e.g., the PEG 8K, with reference to Example 1, and PEG 10K), appear consistent over the widest range of loading.

Figure 3B:
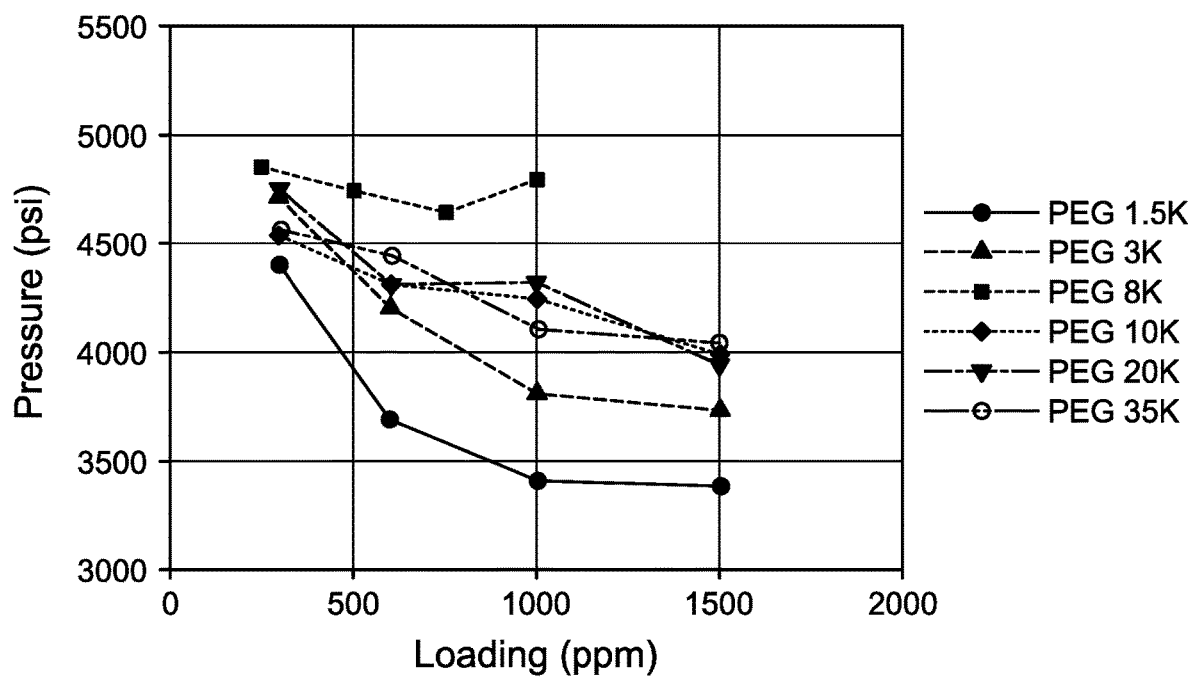
FIG. 3B is a graph showing extruder die pressure vs. loading (ppm) of PEG-based PPAs in connection with some of the Examples
Figure 4A:
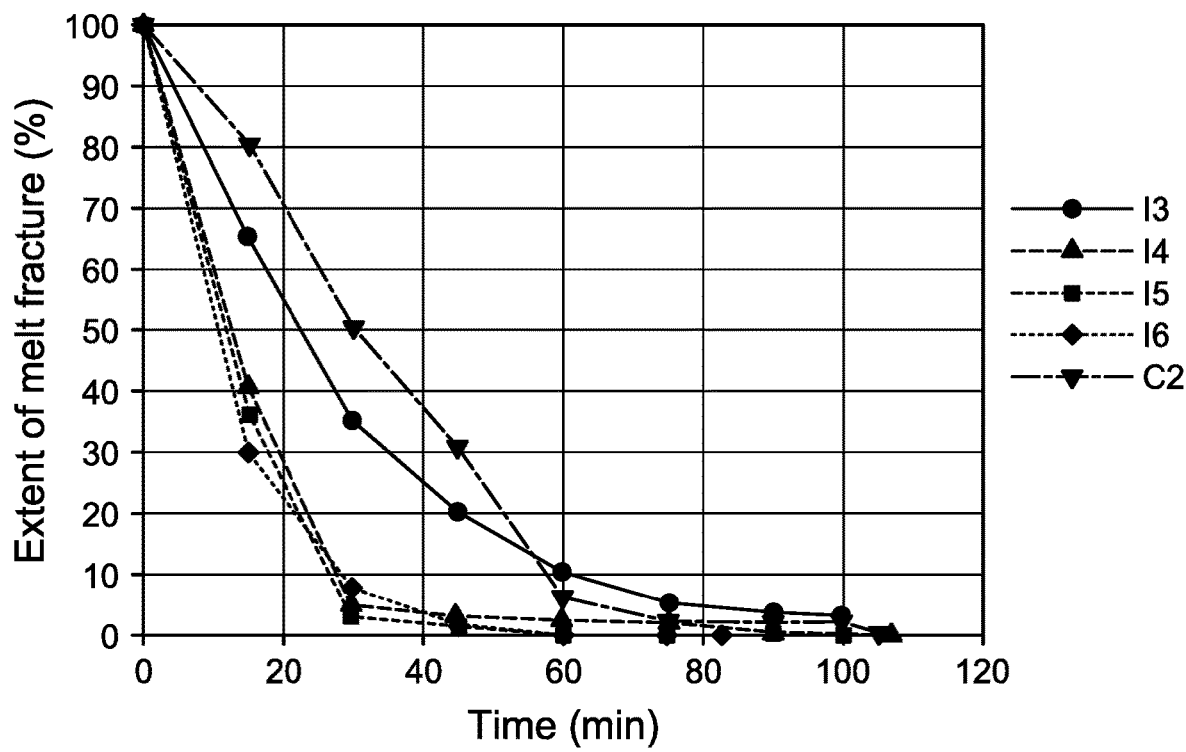
FIG. 4A is a graph showing extent of melt fracture over time in blown films made using various PPAs in connection with some trial runs of the Examples.
Figure 4B:
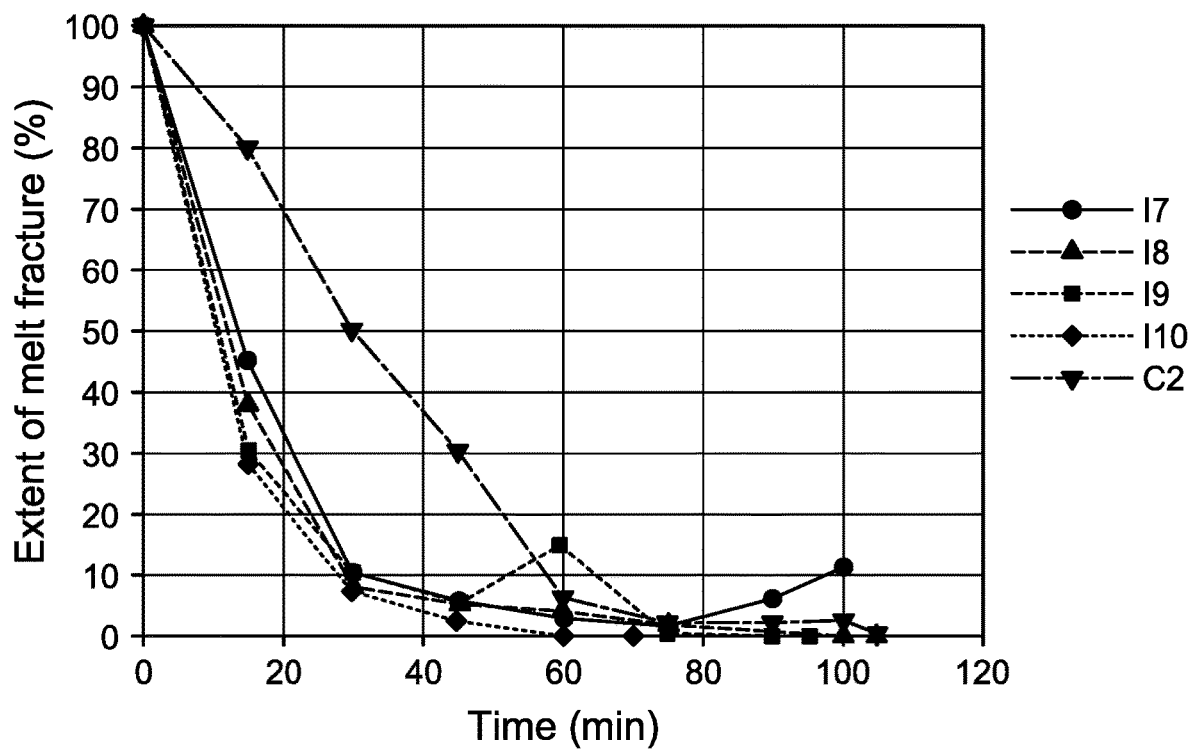
FIG. 4B is a graph showing extent of melt fracture over time in blown films made using various PPAs in connection with further trial runs of the Examples.
Figure 4C:
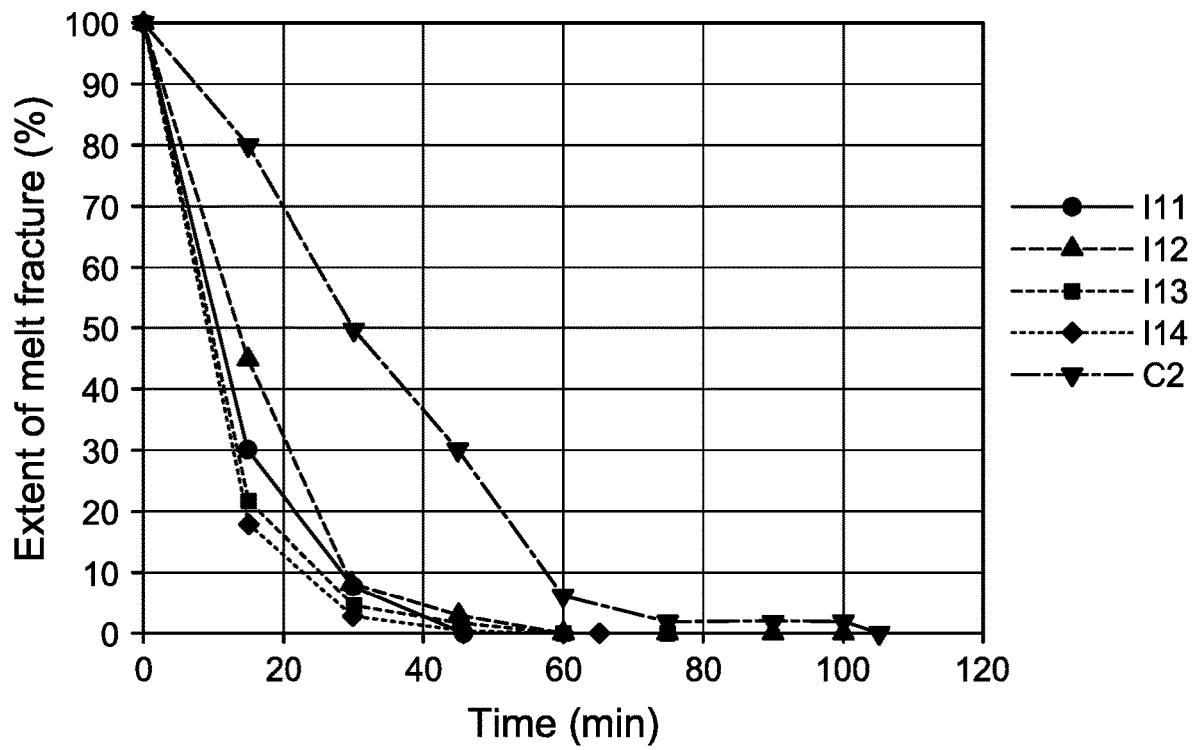
FIG. 4C is a graph showing extent of melt fracture over time in blown films made using various PPAs in connection with yet further trial runs of the Examples.
Figure 4D:
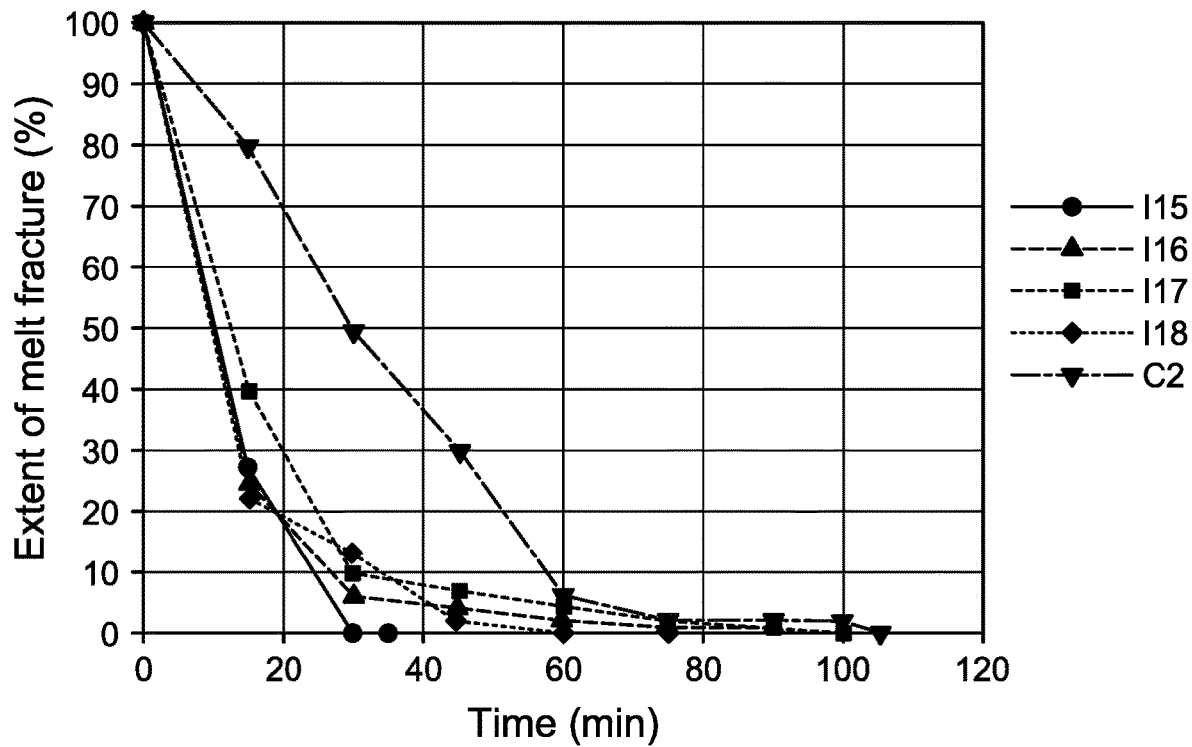
FIG. 4D is a graph showing extent of melt fracture over time in blown films made using various PPAs in connection with yet further trial runs of the Examples.
Figure 4E:
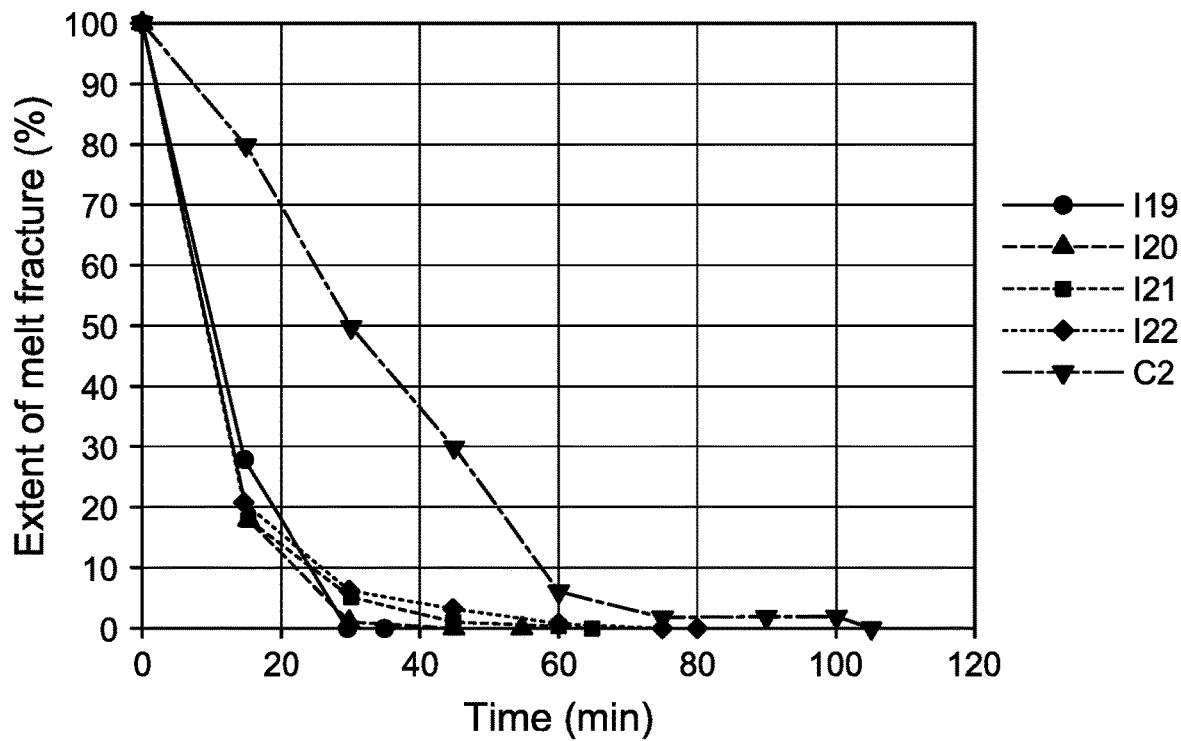
FIG. 4E is a graph showing extent of melt fracture over time in blown films made using various PPAs in connection with yet further trial runs of the Examples.

Reference also FIG. 3B, showing extruder pressure vs. PEG loading for the same PEGs investigated in Examples 1 and 2. Extruder pressure also tends to drop with loading level, although (with reference back to Table 1) the commercial PEG 8K followed this trend up to 750 ppm loading, while 1000 ppm loading reverted to higher pressures, suggesting that higher loadings of PEG in this intermediate molecular weight range may have some detrimental impacts; fortunately, the advantage of simplicity remains for this particular variety of PEG since loadings of 750 ppm consistently eliminated melt fracture (meaning that it is not necessary to accept a downside of higher extruder pressures with, say, 1000 ppm loading, since 750 ppm achieves the desired result).

In addition to Table 3, the effect of loading level of each PEG on melt fracture elimination time is readily seen in FIGS. 4A, 4B, 4C, 4D, and 4E, each showing the extent of melt fracture (%) as a function of time after time T=0 (i.e., as a function of time after PPA feed was resumed to the extruder), for the respective PEG 1.5K, 3K, 10K, 20K, and 35K from Table 3.

Example 3

Examples 1 and 2 discussed melt fracture elimination in blown films made from a single test PE resin (the noted Exceed™ 1018 ethylene-hexene copolymer mLLDPE available from ExxonMobil Chemical Company). Example 3 investigates the effect of different polyethylene resin properties on melt fracture elimination using the PEG 8K as a PPA, and also investigates the effect on melt fracture elimination of slip and antiblock additives in conjunction with the PPA. The resins and additive packages investigated in connection with this example are summarized in Table 4 below (where MI, density, and MIR are each determined according to the methods already described herein). Each polyethylene of Table 4 is a metallocene-catalyzed LLDPE that is a copolymer of ethylene and hexene, with further properties as noted below. It is further noted that the PE used in Examples 1 and 2 is also included in Table 4 for easy reference. All Example 3 runs were carried out on the compound extruder line L2 as described in Example 1, using the polyethylenes and additive packages of Table 4 in place of the polyethylene used in Example 1. Output rates (lbs/hr-in. die) were again within +/−30% of each other for each set of trials in each respective Table 5-9 below.

TABLE 4

PE grades used, in order of example ID.

| PE Ref. | Density | MI | MIR | Non-PPA additives | Architecture |
|---|---|---|---|---|---|
| Exs. 1, 2 | 0.918 | 1 | 16 | Primary/secondary antioxidants | Linear |
| 3-1 | 0.918 | 1 | 16 | Primary/secondary antioxidants, antiblock, slip | Linear |
| 3-2 | 0.923 | 0.48 | 40 | Primary/secondary antioxidants, antiblock, slip | Some long-chain branching |
| 3-3 | 0.938 | 0.28 | 58 | Primary/secondary antioxidants | Some long-chain branching |
| 3-4 | 0.918 | 0.48 | 30 | Primary/secondary antioxidants, antiblock, slip | Linear |
| 3-5 | 0.915 | 0.48 | 29 | Primary/secondary antioxidants | Linear |

Figure 5:
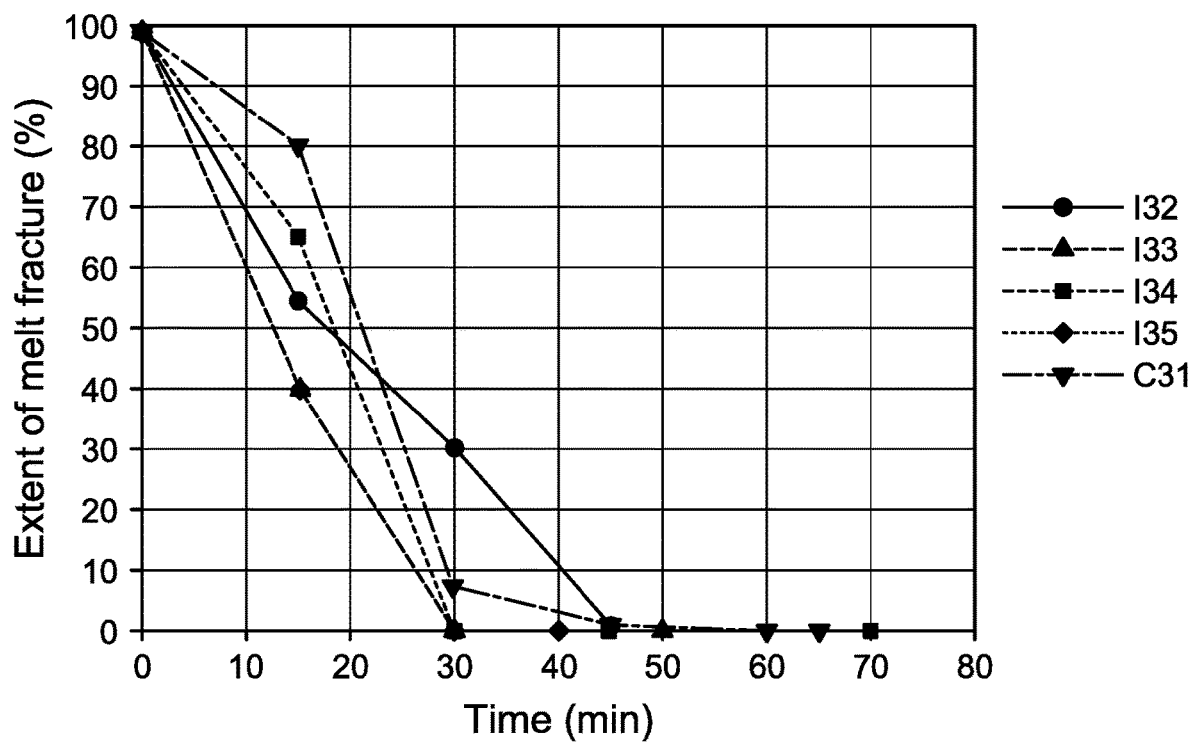
FIG. 5 is a graph showing extent of melt fracture over time in blown films made using various PPAs in connection with some trial runs of the Examples.

FIG. 5 and Table 5 below show the results of melt fracture elimination in blown films made using different PEG 8K loadings with PE 3-1 on line L2. These data illustrate how PEG 8K is comparable to the reference PPA when a slip/antiblock additive package is employed. The reference PPA was faster here than in the slip/antiblock-free version considered in C2 in Example 1. Similarly, the 250 ppm PEG 8K loading level here of I32 was faster than the slip/antiblock-free version in I27 in Example 1.

TABLE 5

PPA performance on L2 for PE 3-1 (linear, 0.918 g/cc density, 1 MI, 16 MIR, antiblock/slip-containing metallocene PE).

| ID | PPA | Melt fracture @ 100 min (%) | Time to Melt fracture elimination (min) | Initial extruder pressure (psi) | Final extruder pressure (psi) |
|---|---|---|---|---|---|
| C31 | 600 ppm reference | 0 | 52 | 5200 | 4200 |
| I32 | 250 ppm PEG 8K | 0 | 52 | 5300 | 4900 |
| I33 | 500 ppm PEG 8K | 0 | 37 | 5115 | 4890 |
| I34 | 750 ppm PEG 8K | 0 | 52 | 5100 | 4700 |
| I35 | 1000 ppm PEG 8K | 0 | 22 | 5100 | 4800 |

Figure 6:
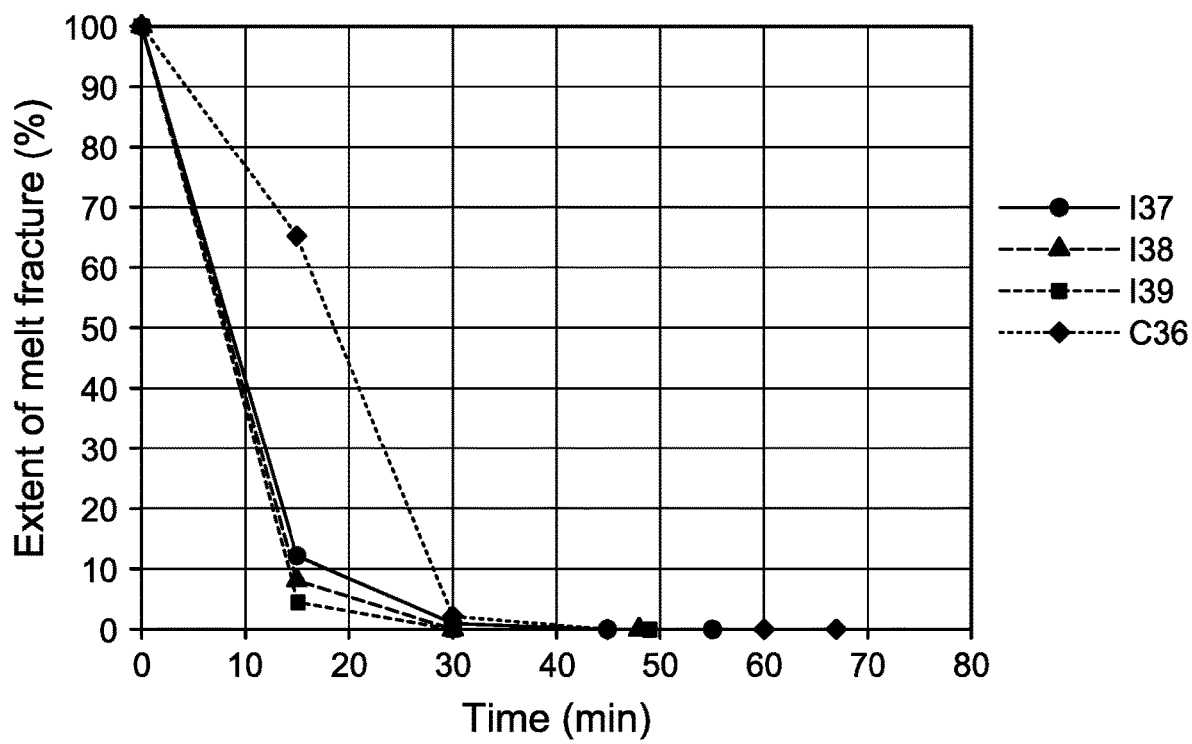
FIG. 6 is a graph showing extent of melt fracture over time in blown films made using various PPAs in connection with some trial runs of the Examples.

FIG. 6 and Table 6 below show the results of melt fracture elimination in blown films made using different PEG 8K loadings with PE 3-2 on line L2. These data illustrate how PEG 8K can eliminate melt fracture significantly faster for a different resin, and appears to be more sensitive than the reference PPA. It appears that the additive will respond depending on a resin's rheological properties. With this resin, its high MI makes it less melt fracture prone; it is possible that this allows the PEG 8K to more rapidly eliminate melt fracture.

TABLE 6

PPA performance on L2 for PE 3-2 (slightly branched, 0.923 g/cc density, 0.48 MI, 40 MIR, antiblock/slip-containing metallocene PE).

| ID | PPA | Melt fracture @ 100 min (%) | Time to Melt fracture elimination (min) | Initial extruder pressure (psi) | Final extruder pressure (psi) |
|---|---|---|---|---|---|
| C36 | 500 ppm reference | 0 | 52 | 4800 | 4100 |
| I37 | 500 ppm PEG 8K | 0 | 50 | 4890 | 4675 |
| I38 | 750 ppm PEG 8K | 0 | 37 | 4850 | 4400 |
| I39 | 1000 ppm PEG 8K | 0 | 37 | 4815 | 4100 |

Figure 7:
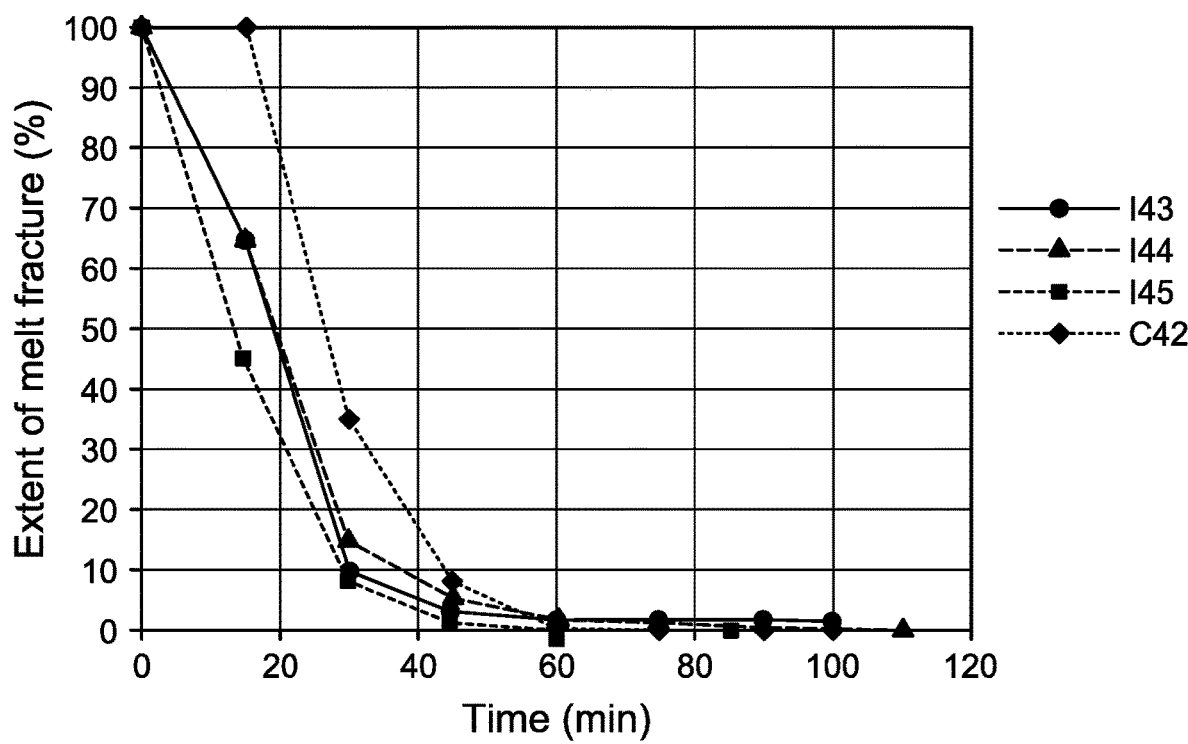
FIG. 7 is a graph showing extent of melt fracture over time in blown films made using various PPAs in connection with some trial runs of the Examples.

FIG. 7 and Table 7 below show the results of melt fracture elimination in blown films made using different PEG 8K loadings with PE 3-3 on line L2. Perhaps due to the resin's low MI, both the reference PPA and the PEG 8K eliminate melt fracture more slowly than in previous grades, leaving behind thin strip of melt fracture that persist for long times. However, for PEG 8K, a higher loading level will satisfactorily reduce this elimination time. It is worth noting that the presence of moderate long-chain branching in PE 3-3, as well as lack of slip/antiblock, may also explain the slower melt fracture elimination.

TABLE 7

PPA performance on L2 for PE 3-3 (slightly branched, 0.938 g/cc density, 0.28 MI, 58 MIR, antiblock-slip-free metallocene PE).

| ID | PPA | Melt fracture @ 100 min (%) | Time to Melt fracture elimination (min) | Initial extruder pressure (psi) | Final extruder pressure (psi) |
|---|---|---|---|---|---|
| C42 | 500 ppm reference | 0.1 | N/A | 4600 | 4230 |
| I43 | 500 ppm PEG 8K | 1.5 | N/A | 4730 | 4900 |
| I44 | 750 ppm PEG 8K | 0.1 | N/A | 4600 | 4800 |
| I45 | 1000 ppm PEG 8K | 0 | 67 | 4700 | 4850 |

Figure 8:
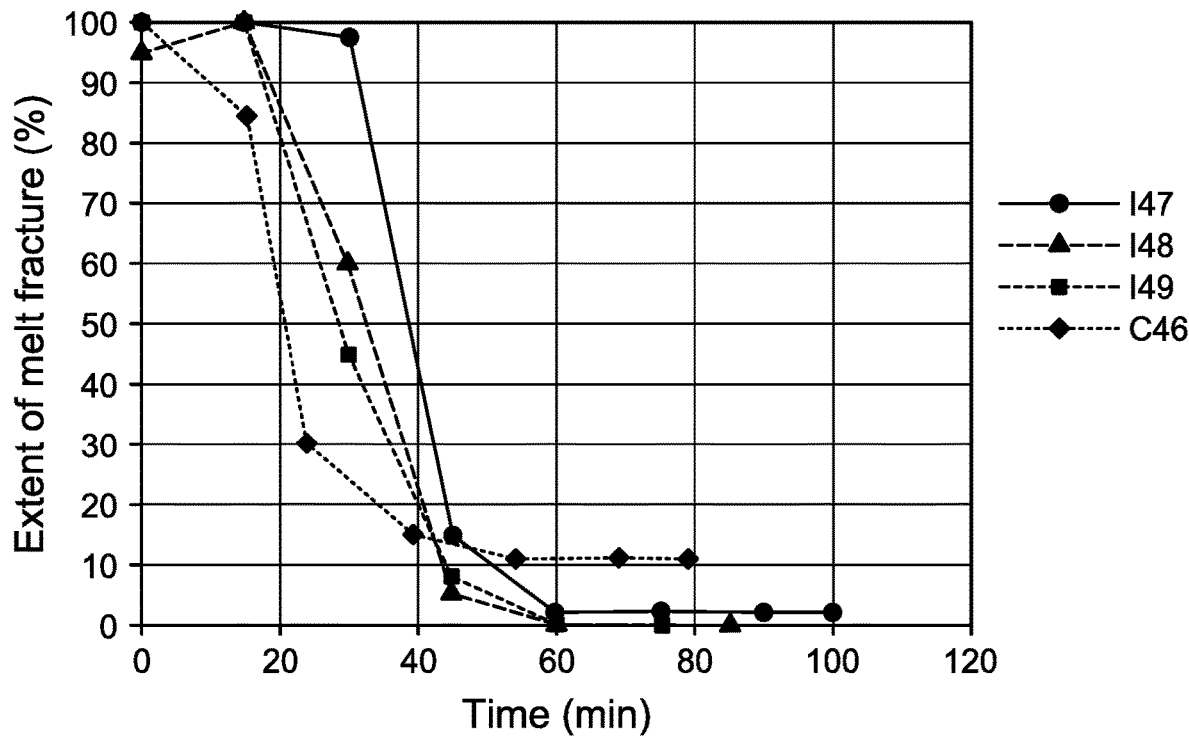
FIG. 8 is a graph showing extent of melt fracture over time in blown films made using various PPAs in connection with some trial runs of the Examples.

FIG. 8 and Table 8 below show the results of melt fracture elimination in blown films made using different PEG 8K loadings with PE 3-4 on line L2. While the reference PPA exhibited an initially faster response, it ultimately was not able to completely clear up the melt fracture, whereas the PEG 8K was able to do so for as low of a composition as 750 ppm.

TABLE 8

PPA performance on L2 for PE 3-4 (linear, 0.915 g/cc density, 0.48 MI, 30 MIR, antiblock-slip-containing metallocene PE).

| ID | PPA | Melt fracture @ 100 min (%) | Time to Melt fracture elimination (min) | Initial extruder pressure (psi) | Final extruder pressure (psi) |
|---|---|---|---|---|---|
| C46 | 600 ppm reference | 11 | N/A | 5650 | 4580 |
| I47 | 500 ppm PEG 8K | 2 | N/A | 5700 | 4755 |
| I48 | 750 ppm PEG 8K | 0 | 53 | 5530 | 4730 |
| I49 | 1000 ppm PEG 8K | 0 | 67 | 5500 | 4650 |

Figure 9:
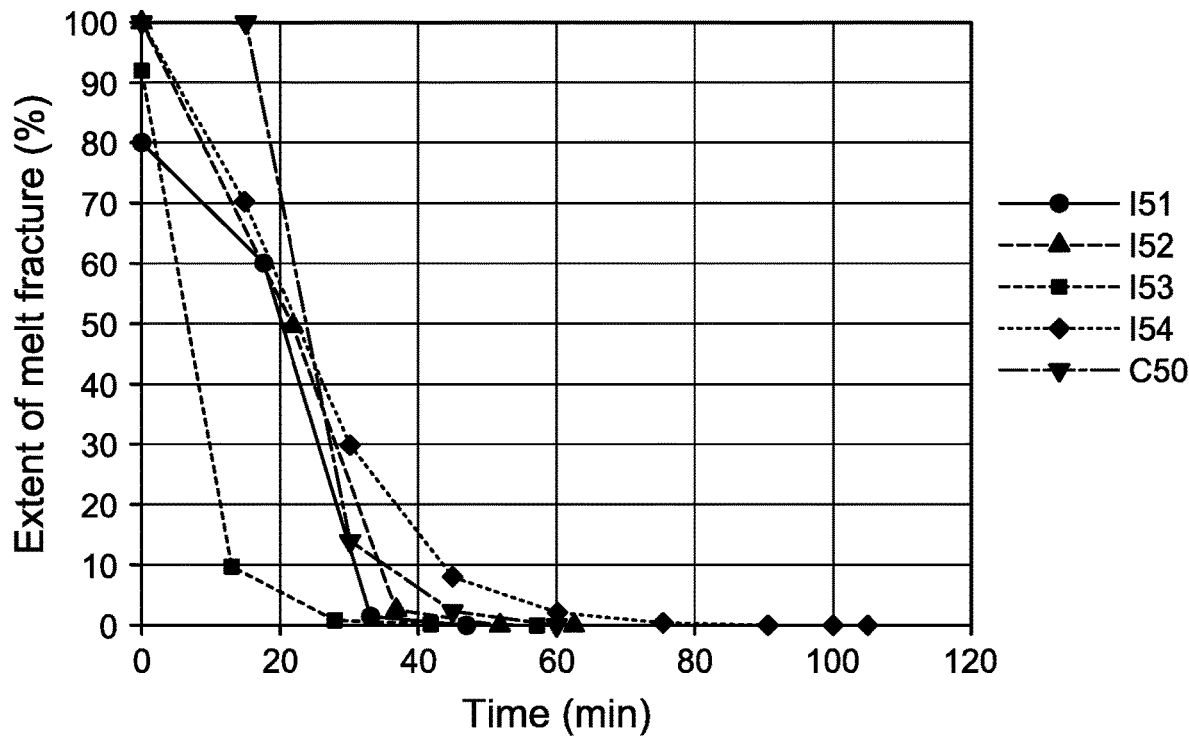
FIG. 9 is a graph showing extent of melt fracture over time in blown films made using various PPAs in connection with some trial runs of the Examples.

FIG. 9 and Table 9 below show the results of melt fracture elimination in blown films made using different PEG 8K loadings with PE 3-5 on line L2. In this case, the PEG 8K outperformed the reference PPA based on melt fracture elimination. Furthermore, comparing FIGS. 8 and 9 is useful since the same PE is used in both, except FIG. 8 is for the resin with antiblock/slip additives (PE 3-4) while FIG. 9 is for the resin without those additives (PE 3-5). This revealed for this resin that melt fracture elimination generally occurred faster in the absence of slip and antiblock. However, for the case of the comparing the PE resin of Example 1 (without slip/antiblock) via FIG. 2A vs. the same PE resin with slip/antiblock (PE 3-1 of Example 3) via FIG. 5, we see the opposite trend: slip/antiblock led to faster melt fracture elimination as compared to its absence. This discrepancy implies a potential resin dependence on the effect of slip and/or antiblock on PPA performance.

TABLE 9

PPA performance on L2 for PE 3-5 (linear, 0.915 g/cc density, 0.48 MI, 30 MIR, antiblock-slip-free metallocene PE).

| ID | PPA | Melt fracture @ 100 min (%) | Time to Melt fracture elimination (min) | Initial extruder pressure (psi) | Final extruder pressure (psi) |
|---|---|---|---|---|---|
| C50 | 500 ppm reference | 0 | 52 | 5650 | 4025 |
| I51 | 500 ppm PEG 8K | 0 | 40 | 5600 | 4750 |
| I52 | 750 ppm PEG 8K | 0.1 | N/A | 5500 | 4750 |
| I53 | 1000 ppm PEG 8K | 0 | 50 | 5750 | 4350 |
| I54 | 1200 ppm PEG 8K | 0 | 95 | 4985 | 3950 |

Example 4

Two different methods of mixing PEG 8K with polyethylene (specifically, PE 3-2 as outlined in connection with Example 3) were investigated. In Method I, the PE granules were tumble-blended in a drum for 30 min., with the following mixed in: primary & secondary antioxidants, antiblock and slip agents, and PEG 8K (which had been preheated to ensure an initial molten state of the PEG 8K before dispersing across the granules during tumble-blending). The blend was then extruded through a compound extruder at a melt temperature of around 450° F. (~232.2° C.) under nitrogen, and pelletized upon exiting the extruder. The pellets were then fed to the blown film line extruder L2 for film conversion.

In contrast, Method II skipped the compound extrusion step; and the blend was fed to the blown film line extruder L2 for film conversion within 12 hours of tumble-blending.

Method I was used for all trial runs previously discussed, including for PE 3-2 in trial runs I37 and I39 (see Example 3 and Table 6). Method II was used for the same PE 3-2 in trial runs I40 and I41. Extrusion results are reported in Table 10 below for both methods at different PEG 8K loading.

TABLE 10

Comparing mixing Methods I and II on L2 for PE 3-2 (slightly branched, 0.923 g/cc density, 0.48 MI, 40 MIR, antiblock/slip-containing metallocene PE).

| ID | PPA | Mix method | Melt fracture @ 100 min (%) | Time to Melt fracture elimination (min) | Initial extruder pressure (psi) | Final extruder pressure (psi) | Screw speed (rpm) |
|---|---|---|---|---|---|---|---|
| I37 | 500 ppm PEG 8K | I | 0 | 50 | 4890 | 4675 | 22 |
| I39 | 750 ppm PEG 8K | I | 0 | 37 | 4815 | 4100 | 22 |
| I40 | 500 ppm PEG 8K | II | 0 | 24 | 3950 | 2400 | 23 |
| I41 | 750 ppm PEG 8K | II | 0 | 4 | 3700 | 1800 | 23 |

Using Method II, major slipping occurs between the molten mixture and the screw, such that the output rates (lbs/hr-in die) observed for Method II were 10-20% of the rates observed for Method I. Further increases to the screw speed did not significantly improve the output. The 0.48 MI, 40 MIR lightly branched resin was the more facile resin to process among those chosen, as evidenced by its low extrusion pressure and propensity to melt fracture. Yet even so, PEG slipped extensively when tumble-blended only. It was likely that without proper homogenization, the molten PEG beaded up in the extruder barrel and formed and macroscopically lubricated interface that interfered with the mixing. This issue was never observed for any of the formulations mixed by Method I, where PEG was dispersed more evenly through each PE pellet.

Example 5

It is desirable that film properties be at least retained if not improved by a PPA substitution from a commercial PPA to PEG-based PPA. PPA can in principle impact surface-sensitive properties because it is believed to migrate to the surface of the molten film in order to mitigate melt fracture. In this Example, 1 mil gauge films were produced from trial runs C1, I25, and I26 (all using the Exceed™ 1018 mLL-DPE having 0.918 g/cc density, 1.0 dg/min MI, and 16 MIR), using blown film line L1. The processing conditions were the same as described in connection with Example 1, but with a film gauge of 1 mil by increasing the nip roll line speed. Results in Table 11 below generally showed that film properties were similar regardless of whether the reference PPA or PEG 8K was used, which suggested no major changes to the film's surface properties. There was one potential tradeoff: the gloss of the film appeared slightly lower with PEG, while the puncture break energy was higher. This implied minor surface changes that did not impact most properties significantly.

Figure 10A:
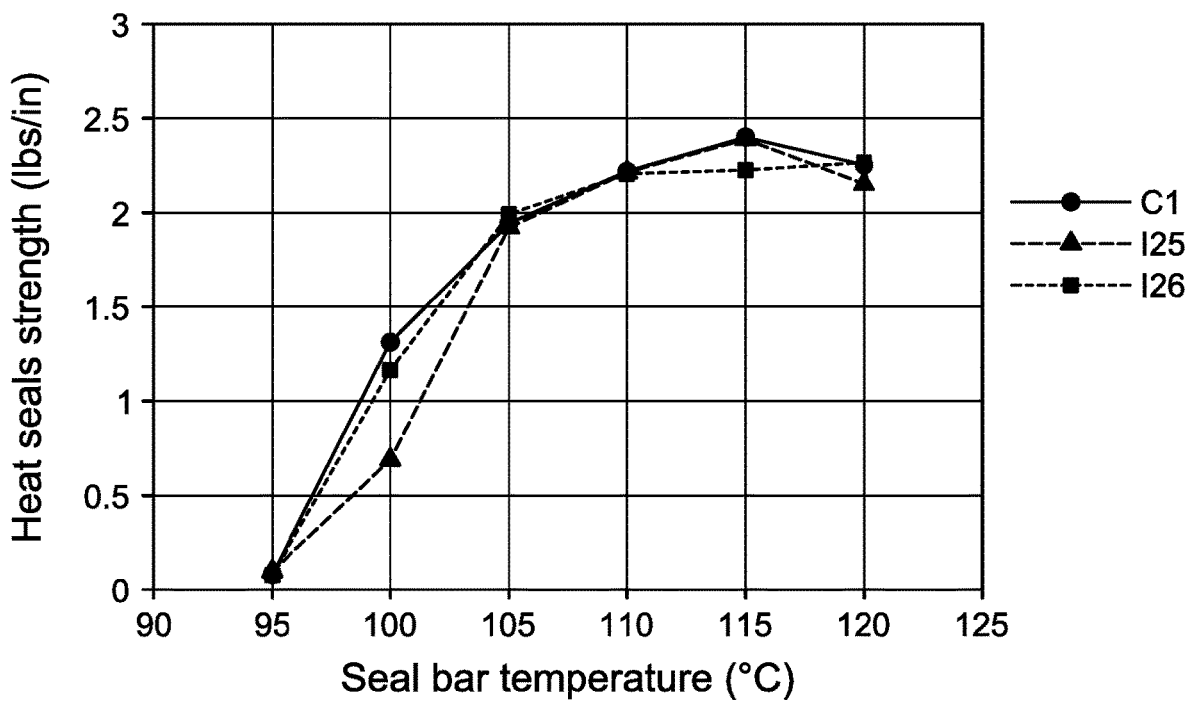
FIG. 10A is a graph showing heat seal strength of some films made using various PPAs in connection with the Examples.
Figure 10B:
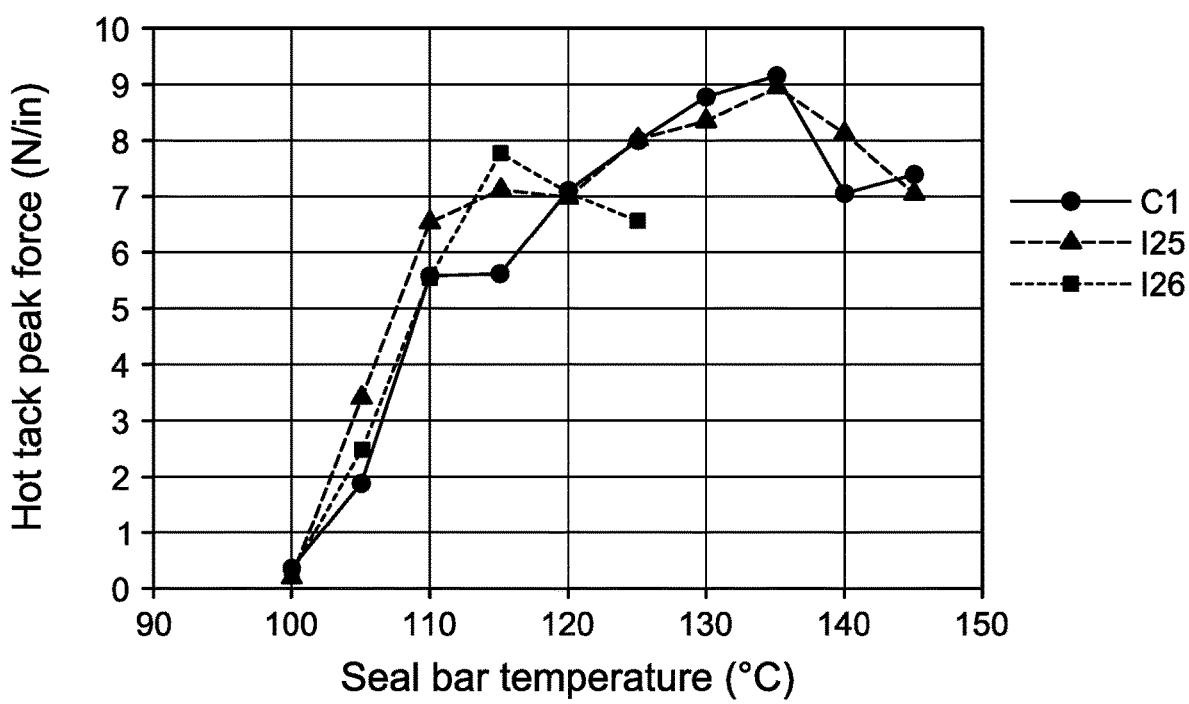
FIG. 10B is a graph showing hot tack peak force of some films made using various PPAs in connection with the Examples.

Similarly, FIGS. 10A and 10B illustrate the very similar heat seal and hot tack peak force curves among the films of trial runs C1, I25, and I26.

TABLE 11

Film properties for 0.918 g/cc d, 1 dg/min MI, 16 MIR linear metallocene PE using various PPA formulations.

| | ID | | |
|---|---|---|---|
| PPA | C1 400 ppm reference PPA | I25 750 ppm PEG 8K | I26 1000 ppm PEG 8K |
| Avg. gauge (mil) | 0.95 | 0.96 | 0.95 |
| 1% secant modulus MD (psi) | 28,358 | 27,601 | 26,687 |

TABLE 11-continued

Film properties for 0.918 g/cc d, 1 dg/min MI, 16 MIR linear metallocene PE using various PPA formulations.

| | ID | | |
|---|---|---|---|
| PPA | C1 400 ppm reference PPA | I25 750 ppm PEG 8K | I26 1000 ppm PEG 8K |
| 1% secant modulus TD (psi) | 30,587 | 29,745 | 29,961 |
| Yield strength MD (psi) | 1,378 | 1,320 | 1,369 |
| Yield strength TD (psi) | 1,368 | 1,419 | 1,340 |
| Elongation at yield MD (%) | 5.5 | 5.4 | 5.5 |
| Elongation at yield TD (%) | 5.1 | 5.3 | 5.1 |
| Tensile strength MD (psi) | 11,094 | 9,769 | 9,870 |
| Tensile strength TD (psi) | 8,770 | 8,975 | 8,357 |
| Elongation at break MD (%) | 552 | 536 | 531 |
| Elongation at break TD (%) | 658 | 668 | 657 |
| Elmendorf tear MD (g/mil) | 277 | 271 | 247 |
| Elmendorf tear TD (g/mil) | 439 | 441 | 476 |
| Total haze (%) | 5.3 | 5.4 | 6.2 |
| Gloss 45° MD (gu) | 73.0 | 65.0 | 61.0 |
| Gloss 45° TD (gu) | 71.0 | 66.0 | 64.0 |
| Dart method A, phenolic (g) | 335 | 317 | 428 |
| Puncture force (lbs/mil) | 13.6 | 14.5 | 13.9 |
| Puncture break energy (in-lbs/mil) | 43.1 | 52.1 | 48.1 |

Example 6

A nuclear magnetic resonance (NMR) method was developed to quantify PEG content analytically. General agreement was found between the two, though there was as much as a 20% difference between any given sample's PEG content as measured by weight before blending vs. as measured by NMR. The weighed values were taken as the default method in this report, since there was no indication of a systematic bias in values between the two methods. Table 12 reports some sample determinations by NMR vs. mass balance (or weighed values) in connection with trial runs I51, I52, and I53.

TABLE 12

Comparing PEG content by two methods.

| ID | PPA | Weighed value during blending (ppm) | Measured value ppm by NMR (ppm) |
|---|---|---|---|
| I51 | 500 ppm PEG 8K | 500 | 412 |
| I52 | 750 ppm PEG 8K | 750 | 670 |
| I53 | 1000 ppm PEG 8K | 1000 | 1268 |

Test Methods

Table 13 below reports the test methods used in connection with the Examples. Unless stated otherwise in the description of a given property, these methods are also to be used in determining properties in accordance with embodiments described herein.

testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited

TABLE 13

Measurement methods.

| Test Name or Parameter Name | Method or description |
|---|---|
| Melt index, high load melt index | ASTM D-1238 2.16 kg (melt index) or 21.6 kg (high load melt index), 190° C. |
| Melt index ratio | High load melt index/melt index |
| Density | ASTM D1505, column density. Samples were molded under ASTM D4703-10a, Procedure C, then conditioned under ASTM D618-08 (23° ± 2° C. and 50 ± 10% relative humidity) for 40 hours before testing |
| Percent melt fracture coverage | Measured by eye. The fraction of melt fracture Estimated visually from a 2-ft long sample of film, taken as a percentage of the area with noticeable, characteristic melt fracture roughness. Clear delineation existed between the melt fractured regions and the smooth, melt fracture free regions of the sample. |
| Pressure | Read off the in-line calibrated pressure transducer of the blown film line extruder, before the screen-pack, and recorded. |
| PEG composition by NMR | 1 H NMR experiments were run on a 700 MHz Bruker AvanceTM IIIHD equipped with a 10 mm high temperature dual channel cryoprobe. Samples were prepped at 140° C. with around 90 mg of sample per 3 ml of 1,1,2,2-tetrachloroethane-d2. Samples were measured using a 30° pulse or less, with 512 transients, a 15 second delay and a temperature of 120° C. The 15 second delay was determined to be needed for accurate quantitative 1 H NMR, The inversion recovery pulse sequence was used to measure T1 with a 20 second delay in between. The variable delay ranged from 1 millisecond to 5 seconds. Once the delay time was determined, samples with ranges of PEG from 0-1800 ppm were measured using the quantitative 1 H NMR conditions. Fits to determine T1 were performed using MestReNova 14.0.1. The signal area used for quantification was 3.8-3.5 ppm. |
| 1% Secant Modulus | ASTM D-882, 15 mm width strip |
| Yield Strength | ASTM D-882, 15 mm width strip |
| Tensile Strength | ASTM D-882, 15 mm width strip |
| Elongation at Break | ASTM D-882, 15 mm width strip |
| Elongation at Yield | ASTM D-882, 15 mm width strip |
| Dart Drop | ASTM D-1709, Phenolic, Method A |
| Haze | ASTM D-1003 |
| Gloss, 45° | ASTM D-2457 |
| Elmendorf Tear | ASTM D1922 with conditioning for 40 hours at 23° ± 2° C. and 50 ± 10% relative humidity |
| Puncture | Modified ASTM D5748: ASTM probe was used with two 0.25 mil HDPE slip sheets. Machine Model: United SFM-1. Testing speed: 10 in/min |
| Heat Seal | Method using 1 inch film strip of 1 mil gauge, sealed at various temperatures under 73 psi (0.5 N/mm$^2$) for 1 second. Following conditioning for 40 hours at 23° ± 2° C. and 50 ± 10% relative humidity, the sealed specimen were tested in T-joint peel mode at 20 inch/min pulling speed |

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and or testing procedures to the extent they are not inconsistent with this text.

thereby. Likewise, the term "comprising" is considered synonymous with the term "including" for purposes of United States law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

While the present disclosure has been described with respect to a number of embodiments and examples, those skilled in the art, having the benefit of this disclosure, will appreciate that other embodiments can be devised which do not depart from the scope and spirit of the present disclosure.

We claim:

1. A blown film made from a polymer composition, wherein the polymer composition comprises polymer pellets that consist of:
   a metallocene-catalyzed linear low density polyethylene (LLDPE) copolymer comprising units derived from ethylene and units derived from one or more $C_3$ to $C_{20}$ α-olefin comonomers and having density within the range from 0.905 to 0.935 g/cm$^3$;
   from 800 to 2,500 ppm (on the basis of mass of the polymer composition) of one or more polyethylene glycols each having weight average molecular weight (Mw) within the range from 7,000 to 9,500 g/mol; and
   optionally, one or more additives selected from the group consisting of fillers, antioxidants, phosphites, anti-cling additives, tackifiers, UV stabilizers, heat stabilizers, release agents, anti-static agents, waxes, and combinations thereof;
   wherein the polymer pellets are formed by a process comprising melt-blending the one or more polyethylene glycols and the copolymer at sufficiently high temperature and/or specific energy input to achieve homogenization among the one or more polyethylene glycols and the copolymer, such that the polymer pellets include the one or more polyethylene glycols homogenously distributed among the copolymer; and
   wherein the blown film has one or more of:
   i. 1% secant modulus (MD) within +/−5% of the value (psi) of a film that is made using a fluoropolymer-based PPA instead of the one or more polyethylene glycols, but is otherwise identical;
   ii. Elmendorf tear (MD) within +/−10% of the value (g) of a film that is made using a fluoropolymer-based PPA instead of the one or more polyethylene glycols, but is otherwise identical:
   iii. Total haze within +/−25% of the value (in %) of a film that is made using a fluoropolymer-based PPA instead of the one or more polyethylene glycols, but is otherwise identical, and/or total haze less than 6%;
   iv. Gloss (MD) within +/−12% of the value (in GU) of a film that is made using a fluoropolymer-based PPA instead of the one or more polyethylene glycols, but is otherwise identical; and
   v. Dart within +/−1%, of the value (g) of a film that is made using a fluoropolymer-based PPA instead of the one or more polyethylene glycols, but is otherwise identical.

2. The blown film of claim 1, wherein the polymer composition has from 800 to 2,000 ppm total of polyethylene glycol.

3. The blown film of claim 1, wherein each polyethylene glycol of the has Mw within the range from 7,500 to 8,500 g/mol.

4. The blown film of claim 1, wherein the copolymer has melt index (ASTM D1238 at 190° C., 2.16 kg loading) within the range from 0.1 to 5.0 g/10 min.

5. The blown film of claim 4, wherein the copolymer is metallocene-catalyzed linear low density polyethylene (mLLDPE), comprising units derived from ethylene and units derived from 1-butene, 1-hexene, or 1-octene.

6. The blown film of claim 5, wherein:
   the copolymer has melt index within the range from 0.1 to less than 0.45 g/10 min (190° C., 2.16 kg); and
   the polymer composition has from 800 ppm to 1100 ppm of polyethylene glycol.

7. The blown film of claim 5, wherein the copolymer has density within the range from 0.910 to 0.930 g/cm$^3$ and melt index (ASTM D1238 at 190° C., 2.16 kg loading) within the range from 0.1 to 1.5 g/10 min.

8. The blown film of claim 1, having all of i., ii., iii., iv., and v.

* * * * *